(12) United States Patent
Asplund et al.

(10) Patent No.: US 8,192,820 B2
(45) Date of Patent: Jun. 5, 2012

(54) DATA STORAGE MEDIA CONTAINING CARBON AND METAL LAYERS

(75) Inventors: Matthew C. Asplund, Provo, UT (US); Robert C. Davis, Provo, UT (US); Douglas P. Hansen, Spanish Fork, UT (US); Matthew R. Linford, Orem, UT (US); Barry M. Lunt, Provo, UT (US); Travis L. Niederhauser, Provo, UT (US); Raymond T. Perkins, Orem, UT (US); Mark O. Worthington, Montrose, CA (US)

(73) Assignee: Brigham Young University, Provo, UT (US)

( * ) Notice: Subject to any disclaimer, the term of this patent is extended or adjusted under 35 U.S.C. 154(b) by 379 days.

(21) Appl. No.: 12/473,249

(22) Filed: May 27, 2009

(65) Prior Publication Data

US 2010/0068444 A1 Mar. 18, 2010

Related U.S. Application Data

(60) Provisional application No. 61/191,839, filed on Sep. 12, 2008, provisional application No. 61/197,089, filed on Oct. 23, 2008, provisional application No. 61/204,010, filed on Dec. 31, 2008, provisional application No. 61/205,739, filed on Jan. 23, 2009.

(51) Int. Cl.
*B32B 3/02* (2006.01)
(52) U.S. Cl. .................. 428/64.1; 428/64.4; 430/270.12
(58) Field of Classification Search .................. 428/64.4; 430/270.12
See application file for complete search history.

(56) References Cited

U.S. PATENT DOCUMENTS

| | | | |
|---|---|---|---|
| 4,074,282 A | 2/1978 | Balas, Jr. et al. | |
| 4,285,056 A | 8/1981 | Bell | |
| 4,319,252 A | 3/1982 | Drexler | |
| 4,322,839 A | 3/1982 | Yamashita et al. | |
| 4,357,366 A | 11/1982 | Takaoka et al. | |
| 4,385,376 A | 5/1983 | Takaoka et al. | |
| 4,410,968 A | 10/1983 | Frohbach et al. | |
| 4,423,427 A | 12/1983 | Kaiser | |
| 4,430,659 A | 2/1984 | Maffitt et al. | |
| 4,433,340 A | 2/1984 | Mashita et al. | |
| 4,435,801 A | 3/1984 | Levin | |
| 4,476,214 A | 10/1984 | Zalm et al. | |
| 4,481,617 A | 11/1984 | Mabry | |
| 4,499,477 A | 2/1985 | Davies et al. | |

(Continued)

FOREIGN PATENT DOCUMENTS

EP 0062975 10/1982

(Continued)

OTHER PUBLICATIONS

Herd et al., "Transmission Electron Microscopy for Optical Storage Material Analysis", May 1983, *Thin Solid Films*, vol. 108, Issue 3, pp. 341-351.

(Continued)

*Primary Examiner* — Elizabeth Mulvaney
(74) *Attorney, Agent, or Firm* — Workman Nydegger

(57) ABSTRACT

Optical information media containing a metal material layer and a carbon material layer are disclosed. The layering of the metal material layer and the carbon material layer are designed to reduce or eliminate problems associated with oxidation and berm formation during writing of data to the media.

35 Claims, 21 Drawing Sheets

| Carbon layer 65 |
|---|
| Data layer 60 |
| Support substrate 10 |

U.S. PATENT DOCUMENTS

| | | | |
|---|---|---|---|
| 4,551,828 A | 11/1985 | Chung | |
| 4,565,772 A | 1/1986 | Takeoka et al. | |
| 4,583,102 A | 4/1986 | Tamura et al. | |
| 4,606,018 A | 8/1986 | Sugiki et al. | |
| 4,625,215 A | 11/1986 | Muchnik et al. | |
| 4,644,519 A | 2/1987 | Markvoort et al. | |
| 4,647,947 A | 3/1987 | Takeoka et al. | |
| 4,682,321 A | 7/1987 | Takaoka et al. | |
| 4,695,994 A | 9/1987 | Steenbergen et al. | |
| 4,726,008 A | 2/1988 | Renaud | |
| 4,727,533 A | 2/1988 | Erbert | |
| 4,833,036 A | 5/1989 | Cannarsa et al. | |
| 4,908,250 A | 3/1990 | Gotoh et al. | |
| 4,929,485 A | 5/1990 | Ohkawa et al. | |
| 4,990,387 A | 2/1991 | Ohkawa | |
| 5,013,635 A | 5/1991 | Ohkawa et al. | |
| 5,061,563 A | 10/1991 | Ohkawa | |
| 5,073,243 A | 12/1991 | Gotoh et al. | |
| 5,102,708 A | 4/1992 | Matsubara et al. | |
| 5,109,377 A | 4/1992 | Yamamoto et al. | |
| 5,154,957 A | 10/1992 | Yamada et al. | |
| 5,188,875 A | 2/1993 | Yamaoka et al. | |
| 5,325,351 A | 6/1994 | Uchiyama et al. | |
| 5,426,013 A | 6/1995 | Strandjord et al. | |
| 5,510,164 A | 4/1996 | Best et al. | |
| 5,580,632 A | 12/1996 | Ohkawa et al. | |
| 5,591,500 A | 1/1997 | Kawanishi | |
| 5,652,037 A | 7/1997 | Ohkawa et al. | |
| 5,796,708 A | 8/1998 | Ohkawa et al. | |
| 5,882,758 A | 3/1999 | Terada et al. | |
| 6,115,352 A | 9/2000 | Ohno et al. | |
| 6,159,572 A | 12/2000 | Kobayashi et al. | |
| 6,168,682 B1 | 1/2001 | Bennett et al. | |
| 6,229,785 B1 | 5/2001 | Kitaura et al. | |
| 6,312,779 B1 | 11/2001 | Hirotsune et al. | |
| 6,338,933 B1 | 1/2002 | Lawandy et al. | |
| 6,352,753 B2 | 3/2002 | Nonaka et al. | |
| 6,495,308 B2 | 12/2002 | Shingai et al. | |
| 6,541,093 B1 * | 4/2003 | Jeong | 428/64.4 |
| 6,576,095 B2 | 6/2003 | Chen | |
| 6,677,104 B2 | 1/2004 | Mizushima et al. | |
| 6,790,592 B2 | 9/2004 | Harigaya et al. | |
| 6,816,330 B2 | 11/2004 | Ikeda et al. | |
| 6,854,126 B2 | 2/2005 | Hirotsune et al. | |
| 6,933,031 B2 | 8/2005 | Ohta et al. | |
| 7,008,681 B2 | 3/2006 | Kitaura et al. | |
| 7,018,698 B2 | 3/2006 | Mizuno et al. | |
| 7,169,533 B2 | 1/2007 | Sakaue et al. | |
| 7,226,664 B2 | 6/2007 | Tanaka et al. | |
| 7,245,580 B2 | 7/2007 | Yamada et al. | |
| 7,420,907 B2 | 9/2008 | Kondo | |
| 7,431,973 B2 | 10/2008 | Kitaura et al. | |
| 7,507,523 B2 | 3/2009 | Yamada et al. | |
| 7,601,481 B2 | 10/2009 | Shinkai et al. | |
| 2001/0012264 A1 | 8/2001 | Kagawa et al. | |
| 2003/0165110 A1 | 9/2003 | Wang et al. | |
| 2003/0235140 A1 | 12/2003 | Holmberg et al. | |
| 2004/0145788 A1 | 7/2004 | Leiber et al. | |
| 2004/0166440 A1 | 8/2004 | Tabata et al. | |
| 2005/0074694 A1 | 4/2005 | Nishihara et al. | |
| 2005/0079444 A1 | 4/2005 | Kiyono et al. | |
| 2005/0237914 A1 | 10/2005 | Oshima et al. | |
| 2005/0243706 A1 | 11/2005 | Lankhorst et al. | |
| 2006/0056277 A1 | 3/2006 | Poupinet et al. | |
| 2006/0062995 A1 | 3/2006 | Yamamoto | |
| 2006/0120253 A1 | 6/2006 | Chen et al. | |
| 2006/0257504 A1 | 11/2006 | Tanaka et al. | |
| 2006/0280111 A1 | 12/2006 | Matsumoto et al. | |
| 2007/0122747 A1 | 5/2007 | Usami et al. | |
| 2007/0134462 A1 | 6/2007 | Sinha et al. | |
| 2007/0134463 A1 | 6/2007 | Sinha et al. | |
| 2007/0253318 A1 | 11/2007 | Hosokawa et al. | |
| 2009/0046566 A1 | 2/2009 | Fujii et al. | |
| 2009/0116372 A1 | 5/2009 | Tsukamoto | |
| 2009/0213720 A1 | 8/2009 | Kondo et al. | |

FOREIGN PATENT DOCUMENTS

| | | |
|---|---|---|
| EP | 0186467 | 7/1986 |
| EP | 0335275 | 10/1989 |
| JP | 63091836 A | 4/1988 |
| JP | 2000006524 A * | 1/2000 |
| WO | WO 94/00841 | 1/1994 |

OTHER PUBLICATIONS

Suh et al., "Writing Process in Ablative Optical Recording", Mar. 15, 1985, *Applied Optics*, vol. 24, No. 6, pp. 868-874.

Kivits et al., "The Hole Formation Process in Tellurium Layers for Optical Data Storage", 1982, *Thin Solid Films*, vol. 87, Issue 3, pp. 215-231.

PCT International Searching Authority, "PCT Search Report and Written Opinion of the International Searching Authority", Dec. 30, 2009, International Application No. PCT/US2009/045357.

Holstein, W.L. et al., "Mechanism of Laser Writing for Optical Data Storage in an Overcoated Tellurium Alloy Trilayer", Oct. 15, 1986, *J. Appl. Phys.*, vol. 60, No. 8, pp. 2938-2943.

Terao, M. et al, "Chalcogenide Thin Films for Laser-Beam Recordings by Thermal Creation of Holes", Nov. 1979, *J. Appl. Phys.*, vol. 50, No. 11, p. 6881-6886.

Kivits, P. et al, "Research on Materials for Optical Storage", Jan./Feb. 1981, *J. Vac. Sci. Technol.*, vol. 18, No. 1, pp. 68-69.

Terao, M. et al., "Oxidation Resistance of Pb-Te-Se Optical Recording Film", Aug. 1, 1987, *J. Appl. Phys.*, vol. 62, No. 3, p. 1029-1034.

Kuhnke et al., "Microstructuring of glassy carbon: comparison of laser machining and reactive ion etching", Apr. 1, 2004, *Thin Solid Films*, vol. 453-454, pp. 36-41.

Terao, M. et al., "Resistance to oxidation of Te-Se optical recording films", (1983) *SPIE Proceedings*, vol. 382, pp. 276-281.

Tyan et al., "Laser recording in Tellurium Suboxide thin films" Feb. 1, 1986, *J. Appl. Phys.*, vol. 59, No. 3, pp. 716-718.

* cited by examiner

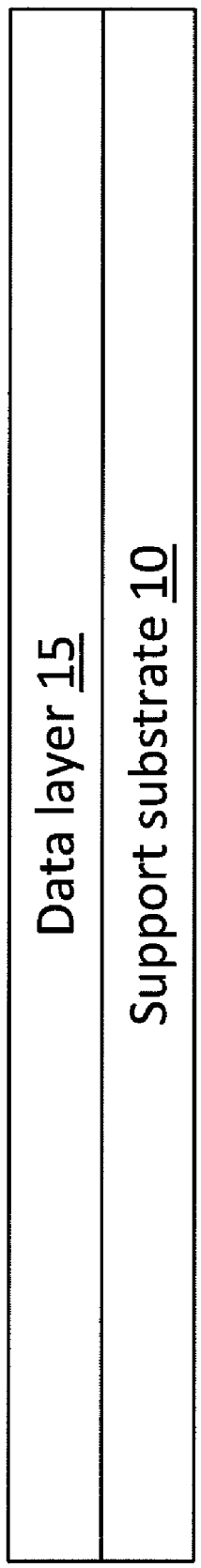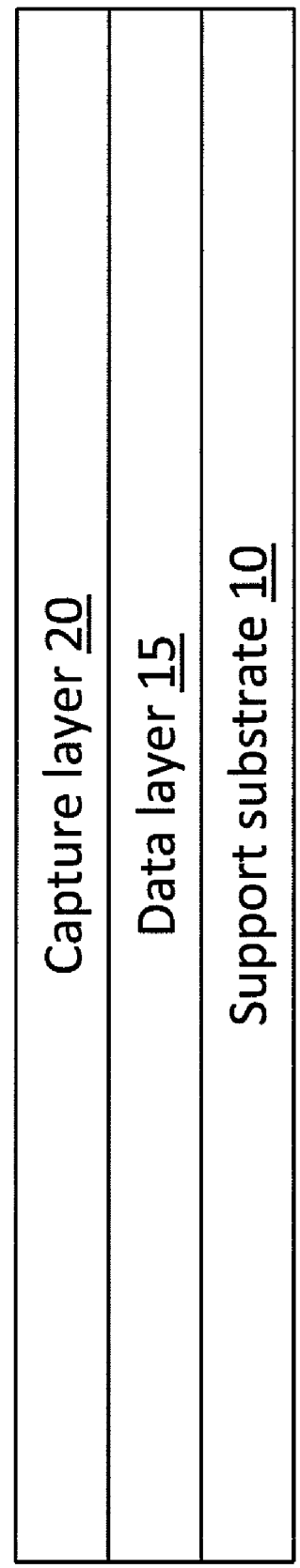
FIG. 1a
FIG. 1b

| Protective sealant barrier 40 | Reflective capture layer 30 | Data layer 15 | Diffusion barrier 35 | Support substrate 10 | Ultraviolet blocking layer 45 | Scratch resistant layer 50 | Environmental protection layer 55 |

FIG. 1g

| Tellurium and carbon dioxide/monoxide data layer 120 |
| --- |
| Support substrate 10 |

FIG. 5a

| Tellurium and carbon dioxide/monoxide data layer 120 |
| --- |
| Intervening layer(s) 70 |
| Support substrate 10 |

FIG. 5b

DATA STORAGE MEDIA CONTAINING CARBON AND METAL LAYERS

CROSS REFERENCE TO RELATED APPLICATIONS

The present application claims priority to U.S. Provisional Patent Application Ser. No. 61/191,839 filed Sep. 12, 2008, U.S. Provisional Patent Application Ser. No. 61/197,089 filed Oct. 23, 2008, U.S. Provisional Patent Application Ser. No. 61/204,010 filed Dec. 31, 2008, and U.S. Provisional Patent Application Ser. No. 61/205,739 filed Jan. 23, 2009, the contents of all of which are incorporated herein by reference.

FIELD OF THE INVENTION

The invention relates to long-term digital data storage media, and more specifically, to materials and manufacturing processes that produce very stable digital data storage media. In particular, optical discs containing a metal layer and a carbon layer are disclosed.

DESCRIPTION OF RELATED ART

Optical information storage media commonly contain several components such as data layers, dielectric layers, and support substrates. The various components each contribute some functionality to the commercial product.

Tellurium materials have been proposed for use in optical information storage media for some time, yet are not commercially used for a variety of reasons. Tellurium is known to be susceptible to oxidation, and a variety of approaches have been tried to reduce or eliminate this problem. An additional problem frequently observed with tellurium media is the formation of "berms". A berm is a raised area surrounding a written "pit" formed when the optical storage media is written using a laser. Material that was originally occupying the space is expelled, and creates the elevated lip "berm". Berms cause an artifact in the HF signal that reduces effective peak-to-peak values when the media is read. This reduces the signal from which the decoder interprets data.

The following is a representative sampling of the scientific and patent literature describing the use of tellurium materials, and attempts made to mitigate the problems associated with the use of tellurium in optical storage media.

A tellurium alloy layer was reported to coalesce into discrete spherical particles after laser writing (Holstein, W. L. and Begnoche, B. C. *J. Appl. Phys.* 60(8): 2938-2943 (1986)). A disc having an aluminum disk substrate was prepared to contain a less than 15 nm thick absorbing layer made of $Te_{80}Se_{19}As_1$ alloy. The absorbing layer was covered with a 250 nm thick sputtered dielectric organic overcoat layer. Increasing the laser power used to write marks to the disc was found to increase size of the marks. Additionally, formation of particles was found to increase with increasing laser power. The authors distinguish these results from those previously reported that found phase change or ablation mechanisms for mark formation.

Shapes of holes formed in thin films over a polymethyl methacrylate substrate were studied using various metal film systems (J. Appl. Phys. 50: 6881 (1979)). The various systems used were As—Te, Ge—Te, As—Se, Ge—Se, and Sb—S. High viscosity of the film was found to be helpful for obtaining cleanly shaped holes.

Electrolytic corrosion was discussed as causing tellurium films to have serious disadvantages for its use in storage media (Kivits, P., et al., *J. Vac. Sci. Technol.* 18(1): 68-69 (1981)). Selenium and/or were added to make the tellurium film amorphous. Climate tests showed that Te—Se—Sb films were stable for more than 200 days. A subsequent publication discussed oxidation inhibition by the addition of In, Pb, Sn, Bi, or Sb into metal-Te—Se films (Terao, M., et al. *J. Appl. Phys.* 62(3): 1029-1034 (1987)).

U.S. Pat. No. 4,322,839 (issued Mar. 30, 1982) offers a continuous wave type semiconductor laser beam, and its use in recording information on an optical disk. The optical disk could contain tellurium oxide. Addition of PbO and $V_2O_5$ in various concentrations was reported to change the optical absorption rate.

European Patent Application No. 82301410.5 (WO 0 062 975 A1; published Oct. 20, 1982) presents an optical recording medium having a tellurium and carbon recording layer. The carbon is present at a predetermined content of 5-50 atomic percent. The tellurium-carbon layer is presented as having good sensitivity and long service life.

U.S. Pat. No. 4,357,366 (issued Nov. 2, 1982) and U.S. Pat. No. 4,385,376 (issued May 24, 1983) suggest adding a thin tellurium film to a base plate, and oxidizing the tellurium to form two oxidizing layers. The multiple oxidizing layers each contain different tellurium oxides. Ultraviolet radiation is used to cause the oxidation.

U.S. Pat. No. 4,410,968 (issued Oct. 18, 1983) offers a deformable metallic tellurium film deposited on a disc substrate, and a modulated light beam to record information. The light liquefies, but does not vaporize, the tellurium material, resulting in a redistribution of material that changes reflectance of a readout light beam.

U.S. Pat. No. 4,423,427 (issued Dec. 27, 1983) suggests the use of discs containing two or more nonconformal coating layers with a solvent barrier layer between the coating layers. An absorptive layer in the disc can be made of a variety of metals and alloys including tellurium or tellurium alloys. The coating layers and solvent barrier layer are helpful in preparing substrates lacking macroscopic and microscopic imperfections.

U.S. Pat. No. 4,433,340 (issued Feb. 21, 1984) offers an optical recording medium having a tellurium layer that contains a certain predetermined atomic percent of carbon. The presence of carbon in the tellurium layer was suggested to reduce oxidation of the tellurium by oxygen or moisture.

U.S. Pat. No. 4,476,214 (issued Oct. 9, 1984) offers an optical information disc containing a substrate plate and a tellurium, selenium, and antimony alloy. The recording layer material satisfies the formula $Te_xSe_ySb_zS_q$ wherein x=55-85 at. %, y=13-30 at. %, z=1-12 at. %, q=0-10 at. % and x+y+z+q=100. Suitable recording layers are $Te_{60}Se_{25}Sb_{10}S_5$ and $Te_{75}Se_{15}Sb_5S_5$ alloys. The alloys were found to confer favorable ablation properties to the recording layer.

U.S. Pat. No. 4,583,102 (issued Apr. 15, 1986) describes an optical disc having a resin disc substrate, a recording medium layer, a transparent layer formed on the recording medium layer, and a transparent protective resin layer. The recording medium layer can contain tellurium oxide or an organic coloring material. The transparent layer can be an adhesive layer or an air layer. The arrangement of layers was reported to give a lower error rate as compared to a conventional optical disk.

European Patent Application No. 85309330.0 (WO 0 186 467 A2; published Jul. 2, 1986) suggests a data recording medium with tellurium and carbon of 10-80 atomic percent. The recording layer can be formed by sputtering tellurium in the presence of methane and argon.

U.S. Pat. No. 4,625,215 (issued Nov. 25, 1986) offers an information storage device having a disk shaped substrate, a planarizing layer, a reflective layer, a three layer structure of a fluorocarbon phase layer, an active layer, and a fluorocarbon matrix layer, an a thin transparent electrically conductive over-layer. The active layer is encapsulated between the phase layer and the matrix layer. The active layer contains globules of a tellurium, selenium, and arsenic alloy. Application of a laser beam causes agglomeration of the active layer, and changes the optical transmittance of the three-layer structure. The phase layer isolates the active layer from the heat sinking effect of the reflecting layer, allowing the laser energy to be dissipated in the active layer.

U.S. Pat. No. 4,647,947 (issued Mar. 3, 1987) describes a substrate and an electromagnetic energy-absorbing layer. The layer can contain low melting metals such as tellurium, antimony, tin, bismuth, zinc, or lead. The layer can also contain elements that are in a gaseous state at a temperature below a predetermined temperature. Application of energy causes the recording layer to be raised, forming a protuberance.

U.S. Pat. No. 4,682,321 (issued Jul. 21, 1987) suggests an optical disk containing multiple thin film layers made of germanium, tellurium, bismuth, antimony, and alloys thereof. Irradiation with a laser beam converts the multiple layers into a single layer.

European Patent Application No. 89105303.5 (WO 0 335 275 A2; published Oct. 4, 1989) describes use of a recording film containing tellurium, carbon, and hydrogen. The carbon plus hydrogen contents are defined by their atomic percentages to be equal to or greater than 25 atomic percent, and less than or equal to 38 atomic percent. The ranges were selected to provide good recording sensitivity, oxidation resistance, and reproducing laser power margin.

U.S. Pat. No. 4,908,250 (issued Mar. 13, 1990) and U.S. Pat. No. 5,073,243 (issued Dec. 17, 1991) offer a disc having a substrate, an under layer, and a low melting tellurium recording layer. The under layer relaxes the thermal shock transmitted from the recording layer to the disc substrate. The under layer contains a high polymeric material having a superior heat resistance than that of the substrate. Fluorocarbon resins or polyimides are offered as example polymeric materials.

U.S. Pat. No. 4,929,485 (issued May 29, 1990) offers an information storage medium having an amorphous structure recording layer containing carbon and a metal element, semi-metal element, or semiconductor element. Examples of the elements include Te, Se, Bi, Pb, Sb, Ag, Ga, As, and Ge. Application of energy to the recording layer changes the structure from amorphous form to crystalline form. These structures are offered to address the oxidation properties of tellurium or other previously used metals.

U.S. Pat. No. 4,990,387 (issued Feb. 5, 1991) suggests use of a carbon and fluorine under-layer to act as a diffusion barrier protecting against water and oxygen penetration into a recording layer. The recording layer is described as containing carbon and a metal and semiconductor element such as Te, Se, Ge, Sb, Pb, Sn, Ag, In, and Bi. The recording layer has good write sensitivity and anti-oxidation characteristics.

U.S. Pat. No. 5,013,635 (issued May 7, 1991) presents an information storage medium consisting of a polycarbonate substrate and a recording layer containing an AgTe eutectic alloy, carbon, and hydrogen. These structures are offered to address the oxidation properties of tellurium or other previously used metals.

U.S. Pat. No. 5,061,563 suggests preparing a recording film that contains tellurium, carbon, and hydrogen having a structure in which tellurium clusters are dispersed in a C—H matrix where carbon and hydrogen are bonded to each other by chemical bonds. This system was suggested as a possible solution to problems caused by oxidation of tellurium films. The resulting recording film was found to absorb in the far-infrared range (25 to 100 μm).

U.S. Pat. No. 5,102,708 (issued Apr. 7, 1992) offers a data recording medium containing a substrate, an undercoat layer formed by plasma polymerization of $C_4F_8$ fluorocarbon gas, and a recording layer containing Te, C, H, and a metal consisting of Ag, Au, and Cu in various content ratios.

U.S. Pat. No. 5,510,164 (issued Apr. 23, 1996) describes an optical disk containing a tellurium-based active data layer. Irradiation with a laser causes the tellurium alloy to flow and form holes. The disk contains a "soft" deformable layer directly on the tellurium layer. Silicone elastomers, fluorinated hydrocarbon, polyacrylate, ethylene propylene, and polyurethane are listed as example materials for the deformable layer. The deformable layer is soft to allow the tellurium to flow without requiring excessive laser power.

U.S. Pat. No. 5,580,632 (issued Dec. 3, 1996) and U.S. Pat. No. 5,652,037 (issued Jul. 29, 1997) describe recording films made of an amorphous alloy containing Ge, Sb, and Te. Irradiating the film changes the alloy into crystalline GeTe and crystalline SbTe. This change is optically detectable.

U.S. Pat. No. 5,796,708 (issued Aug. 18, 1998) offers an optical disc having a first recording sublayer of Ge—Sb—Te and a second recording sublayer of Bi—Te.

Despite the many reported developments relating to the use of tellurium and other metals in optical information media, there still exists a need for new materials and methods to make metals commercially attractive for use in optical information media. Materials and methods that reduce or eliminate problems associated with oxidation and berm formation are particularly attractive.

Dielectric layers are frequently included in optical data discs to protect the data layer materials from corrosion caused by diffused oxygen or water. Dielectric layers are frequently made from inorganic materials such as silicon dioxide, zinc sulfide-silicon dioxide, zirconium oxide, or silicon-nickel oxynitride. Dielectric layers containing silicon dioxide are currently widely used in commercial products.

Dielectric layers also act as electrical insulators, effectively separating different layers of the optical disc.

Materials used in the dielectric layer are usually selected for their optical transparency, such that the layer does not optically interfere with writing or reading data to or from the disc. The optical properties of dielectric materials vary with the wavelength of light used. For example, silicon is transparent at wavelengths of light longer than 400 nm, but is absorptive at wavelengths of light shorter than 400 nm.

Conventional dielectric materials are also used to thermally protect substrates and write layers. Dielectric materials are not prone to pinhole defects, and in their glassy state are mostly impervious to degradation. The selection of a particular dielectric material can involve many criteria such as cost, adhesion to adjacent materials at their interfaces, miscibility or immiscibility of materials, melting points, and heat capacities.

Carbon has not been widely used in commercial optical media. The following are several references that discuss the use of various materials, including carbon, as "interface layers".

U.S. Patent Publication No. 2004/0166440 A1 (published Aug. 26, 2004) offers phase-change rewritable optical disks having a substrate, first protective layer, recording layer, second protective layer, and reflective layer. The recording layer includes a complex composition of Sb, Te, Ge, and In in particular defined atomic ratios. The publication allows for the addition of a nitride, oxide, or carbide "interface layer" on one or both sides of the recording layer. The disks can also contain a "diffusion protective layer" made of similar materials. The interface layer lacks sulfur components, and protects the recording layer against sulfur penetration.

U.S. Patent Publication No. 2005/0074694 A1 (published Apr. 7, 2005) suggests an information recording medium including a phase change recording layer whose phase can be changed between a crystalline phase and an amorphous phase, a Cr and O layer, and a Ga and O layer. Working Example 11 describes addition of a C-containing layer located between the recording layer and the Ga-containing layer provided as an "interface layer", and/or between the Cr-containing layer and the recording layer. Interface layers function to prevent the migration of substances between dielectric layers and the recording layer. The interface layer has low optical absorption, has a melting point that is so high that it does not melt during recording, and has good adhesion to the recording layer.

U.S. Pat. No. 6,790,592 B2 (issued Sep. 14, 2004) offers phase-change optical information media having specified recording layers and other complex layerings. The patent provides for upper and lower protective layers made of a variety of materials including metal oxides, nitrides, sulfides, carbides, diamond-like carbon, and mixtures thereof. The patent "requires" that the protective layers have a higher melting point than that of the recording layer. The patent also "requires" that the protective layers have a high thermal conductivity, a low coefficient of thermal expansion, and good adhesion properties.

U.S. Pat. No. 7,169,533 B2 (issued Jan. 30, 2007) offers phase-change optical information recording media having a transparent substrate, reversible recording layer, Ta-based dielectric layer, and silver reflective layer. An "interface layer" containing carbon or a nitride, oxide, carbide, or nitrooxide of element alpha (Sn, In, Zr, Si, Cr, Al, V, Nb, Mo, W, Ti, Mg, or Ge) can be used to prevent exfoliation. The interface layer also prevents diffusion of atoms between the recording layer and the dielectric layer. The interface layer thickness is preferably at least 1 nm and at most 10 nm thick, and more preferably at least 1 nm and at most 5 nm thick.

In most commercial products, data is recorded by altering the molecular state of an organic dye or the phase of a metal or alloy, and other materials in the product are selected to be compatible with these data storage mechanisms. However, in order to achieve permanent data storage, other more permanent and irreversible mechanisms are desired. Despite the many reported developments relating to the use of inorganic materials as dielectric layers in optical information media, there still exists a need for new materials and methods.

SUMMARY OF THE INVENTION

Optical information media containing various combinations of a metal material layer and a carbon material layer are disclosed. The use of a carbon material layer protects a nearby data layer from various factors such as oxidation, heat deformation, and stress-induced damage. The use of a carbon material layer can also reduce or eliminate berm formation in the metal material layer after writing with a laser or other energy source. The carbon material layers can also be used as a dielectric layer in a variety of optical information media. The combination of carbon material layers and metal material layers has been found to be surprisingly attractive for the development of archival-quality optical information media.

DESCRIPTION OF THE FIGURES

The following figures form part of the present specification and are included to further demonstrate certain aspects of the present invention. The invention may be better understood by reference to one or more of these figures in combination with the detailed description of specific embodiments presented herein.

FIG. 1a shows an optical information medium having a support substrate and a data layer.

FIG. 1b shows an optical information medium having a support substrate, a data layer, and a capture layer.

FIG. 1g shows an optical information medium having an environmental protection layer, a scratch resistant layer, an ultraviolet blocking layer, a support substrate, a diffusion barrier, a data layer, a reflective capture layer, and a protective sealant barrier.

FIG. 5a shows an optical information medium having a substrate layer facially contacting a tellurium/carbon dioxide/monoxide data layer.

FIG. 5b shows an optical information medium having a substrate layer, at least one intervening layer, and a tellurium/carbon dioxide/monoxide data layer.

DETAILED DESCRIPTION OF THE INVENTION

Figure 1C:
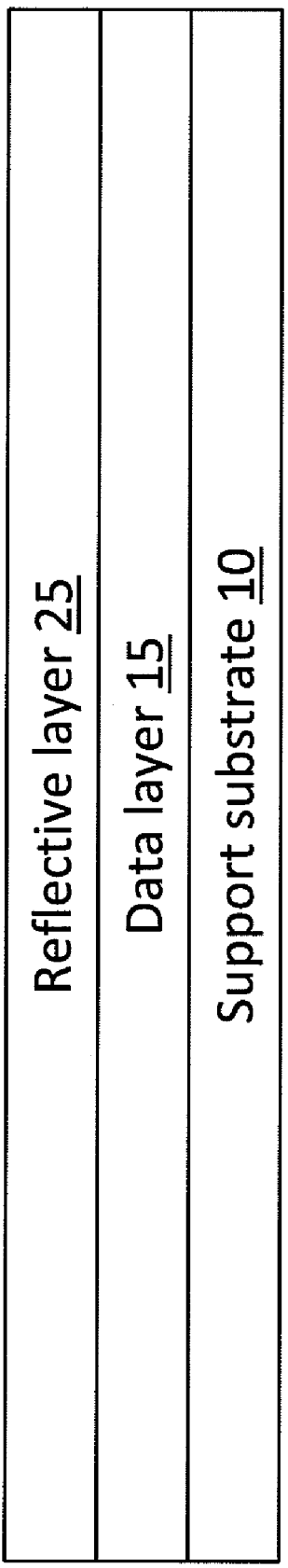
FIG. 1c shows an optical information medium having a support substrate, a data layer, and a reflective layer.

While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

The optical information media described herein are preferably not magnetic. Data written to the optical information media described herein preferably are not reversible or phase-change marks, but rather are permanent, non-erasable, physical change marks.

The optical information media described herein are preferably suitable for use as archival media. Data stored on archival media is preferably readable after about 1 month, after about 1 year, after about 2 years, after about 3 years, after about 4 years, after about 5 years, after about 6 years, after about 7 years, after about 8 years, after about 9 years, after about 10 years, after about 20 years, after about 30 years, after about 40 years, after about 50 years, after about 60 years, after about 70 years, after about 80 years, after about 90 years, after about 100 years, after about 200 years, after about 300 years, after about 400 years, after about 500 years, and ideally indefinitely.

The optical information media described below can generally be any shape and size. The media are typically flat and round in shape. Currently envisioned sizes are about 8 cm diameter, about 12 cm diameter (like a conventional CD or DVD), about 13 cm diameter, about 20 cm diameter, about 10 inch (about 25.4 cm) diameter, about 26 cm diameter, and about 12 inch (about 30.48 cm) diameter.

A cross-section view of the optical information media can be symmetrical or asymmetrical. The cross-section is most commonly asymmetrical.

The optical information media described below generally include at least one support substrate. The support substrate can generally be any material compatible with use in optical information storage. Polymers or ceramic materials having desirable optical and mechanical properties are widely available. Support substrates typically comprise polycarbonate, polystyrene, aluminum oxide, polydimethyl siloxane, polymethylmethacrylate, silicon oxide, glass, aluminum, stainless steel, or mixtures thereof. If substrate transparency is not desired, then metal substrates may be used. Other optically transparent plastics or polymers may also be used. Support substrates can be selected from materials having sufficient rigidity or stiffness. Rigidity or stiffness is commonly measured as Young's modulus in units of pressure per unit area, and preferably is about 0.5 GPa to about 70 GPa. Specific examples of stiffness values are about 0.5 GPa, about 1 GPa, about 5 GPa, about 10 GPa, about 20 GPa, about 30 GPa, about 40 GPa, about 50 GPa, about 60 GPa, about 70 GPa, and ranges between any two of these values. Support substrates can be selected from materials having an index of refraction of about 1.45 to about 1.70. Specific examples of an index of refraction include about 1.45, about 1.5, about 1.55, about 1.6, about 1.65, about 1.7, and ranges between any two of these values.

The substrate preferably comprises materials that are not subject to age degradation effects. Presently preferred materials are polycarbonate, glass, and silicon oxide (fused silica).

The support substrate can generally be any thickness. The substrate thickness can be selected as a function of the drive capacity: 1.2 millimeter-thick substrates are compatible with CD drives, 0.6 millimeter-thick substrates are compatible with DVD drives, and 0.1 millimeter-thick substrates are compatible with BD drives. The thickness was historically chosen both to keep the rotating mass within reasonable limits while maintaining the necessary flatness and rigidity of the substrate to keep the data layer in focus during the read and the write process.

Materials—Carbon Layer

One embodiment of the present invention comprises an optical information medium suitable for archival purposes. The materials and manufacturing processes are designed to be very durable and not subject to age-degradation effects to a substantial degree. Likewise, the information writing process is intended to be permanent and not subject to age degradation effects to a substantial degree. The medium includes at least one support substrate 10 and at least one data layer 20 infused with a gas. This is depicted in FIG. 1a.

The data layer can comprise carbon, amorphous carbon, diamond-like carbon, silicon carbide, boron carbide, boron nitride, silicon, amorphous silicon, germanium, amorphous germanium, or combinations thereof. It is presently preferred that the data layer comprises amorphous carbon. Amorphous carbon is a stable substance that requires a considerable amount of activation energy to modify its optical properties. This feature makes amorphous carbon unaffected by typical thermal and chemical kinetic aging processes. Amorphous carbon also possesses excellent chemical resistance, and a high degree of graphitic ($SP^2$) type carbon.

The data layer also includes at least one gas infused into the structure. The term "infused" refers to at least one gas that is covalently bonded, entrapped, or adsorbed into or onto the amorphous carbon or other material. Upon treatment with an appropriate energy source, the treated data layer can decompose and liberate gas. This liberated gas expands and can create a protrusion or ablation site, thereby creating a detectable optical contrast between treated sites and untreated sites. The gas can lack oxygen atoms or contain oxygen atoms. The data layer can be infused with one gas, or can be infused with two or more different gases. If the data layer is infused with two or more gases, they can all lack oxygen atoms, all contain oxygen atoms, or be a mixture of one or more gases that lack oxygen atoms and one or more gases that contain oxygen atoms.

Examples of a gas that lacks oxygen atoms include molecular hydrogen ($H_2$), molecular nitrogen ($N_2$), helium (He), argon (Ar), neon (Ne), krypton (Kr), xenon (Xe), chlorine ($Cl_2$), and fluorine ($F_2$).

In a presently preferred embodiment, the gas is an oxygenated gas. The term "oxygenated gas" refers to a gas whose molecular formula includes at least one oxygen atom. Examples of such gases include carbon monoxide (CO), carbon dioxide ($CO_2$), molecular oxygen ($O_2$), ozone ($O_3$), nitrogen oxides ($NO_x$), sulfur oxides ($SO_x$), and mixtures thereof. Oxygen is believed to increase the data layer's volatility when heated to extreme temperatures. Oxygen is further believed to stabilize the write layer under normal conditions, especially with regards to residual stresses in carbon films. This stabilization is believed to result as oxygen, when covalently bonded to the carbon, oxidizes the carbon to produce a very non-reactive compound. The data layer can be infused with one oxygenated-gas, or can be infused with two or more different oxygenated gases.

The transparency (or opacity) of the data layer can be modified by adjusting the concentration of gas used in the preparation of the data layer. Higher concentrations of gas have been found by the instant inventors to lead to greater transparency of the data layer. The incorporated gas can be detected and quantified using methods such as XPS. The resulting coating layer has a higher concentration of gas, oxygen, or oxygenated gas than it would if prepared otherwise in the same manner but lacking the added gas during preparation.

The gas has been found to aid in ablation of the data layer. The following is a discussion of the mechanism currently believed to enhance ablation. The exact mechanism is not considered to be limiting on embodiments of the instant invention. During the write process, extreme heat generated by the write laser breaks the normally strong and stable covalent bonds between the gas and carbon atoms. The gas heating and separation process creates an explosion, expelling both the gas and the amorphous carbon from the data layer. The gas expulsion has the combined effect of ablating the write layer from the optical disc or permanently modifying the written portion of the data layer to be either significantly more opaque or more transparent, depending on the system design, to a read laser than the unwritten data layer areas. Both the written and unwritten portions of the data layer are extremely non-reactive (unaffected by typical thermal and chemical kinetic aging processes) and optically distinct. Additionally, transforming from gas-infused to gas-less states requires significant activation energy, preventing the change from occurring through natural chemical kinetic aging.

The data layer can generally be any thickness. The data layer thickness provides optical absorption. A lower thickness limit can be about 10 nm or about 20 nm. An upper thickness limit can be determined by the energy required to modify the data layer, and will vary depending on the material chosen. An example of an upper limit is about 100 nm. Example thicknesses are about 10 nm, about 20 nm, about 30 nm, about 40 nm, about 50 nm, about 60 nm, about 70 nm, about 80 nm, about 90 nm, about 100 nm, and ranges between any two of these values. A thickness value can be theoretically calculated as lambda/2n, where lambda is the read wavelength, and n is the index of refraction of the layer.

The support substrate can directly facially contact the gas infused data layer without any intervening layer or layers. Alternatively, one or more additional layers can be placed between the support substrate and the data layer.

The substrate's and data layer's index of refraction, thickness, and opacity may be optimized in the unwritten state to optically reflect a read laser. Light entering the bottom of the disc in the form of a read laser creates a first reflected beam from the support substrate/data layer interface and a second reflected beam from the data layer/air interface. Adjusting the data layer thickness such that both reflected beams are in-phase maximizes reflection through constructive interference. Increased reflection at the disc's unwritten state can provide greater optical contrast between written and unwritten portions, increasing the signal-to-noise ratio in the read process.

Written portions of the data layer can be ablated or removed from the disc by means of a high-power write-laser intensity modulated to a data stream recorded on the disc. A significantly less-intense read laser passes through the ablated portions of the data layer or is absorbed in the gas-less opaque carbon in optical contrast to the maximized reflection that occurs at unwritten portions of the data layer. A photodiode detects the optical contrast between written, or non-reflected, and unwritten, or reflected, portions of the disc.

Additional layers may be added to make the disc more suitable for writing, more durable for archiving, or more compatible with existing optical disc capacities and formats. The optical information medium can further comprise an ablation capture layer 20. An ablation capture layer can cover the data layer to capture material ablated during the write process and to protect the data layer. Materials suitable for the ablation capture layer include aerogels, or thin metal layers. Other suitable materials include aluminum, chromium, titanium, silver, gold, platinum, rhodium, silicon, germanium, palladium, iridium, tin, indium, other metals, ceramics, $SiO_2$, $Al_2O_3$, alloys thereof, and mixtures thereof. When an ablation capture layer is present, the write process permanently separates gases originally infused in the data layer, creating a void in the layer and a bubble or protuberance in the ablation capture layer. As described earlier, unwritten portions of the data layer remain unchanged over time because the infused gas is not easily removed except through the high-power energy write process. The ablation capture layer has the additional advantage of sealing the data layer to prevent potential writing-optics contamination from ablated materials during the write process. The protuberance in the ablation capture layer creates an optical contrast to the unwritten or undisturbed write layer portions as the protuberance absorbs the read laser, creating the same effect as if the read laser were transmitted through the optical disc entirely. If the gases removed from the data layer and captured below the ablation capture layer were to eventually leave the protuberance, the optical properties of the protuberance would remain unchanged. Accordingly, because the optical properties of the written and unwritten portions are permanent, the disc is not subject to age degradation effects.

Figure 1D:
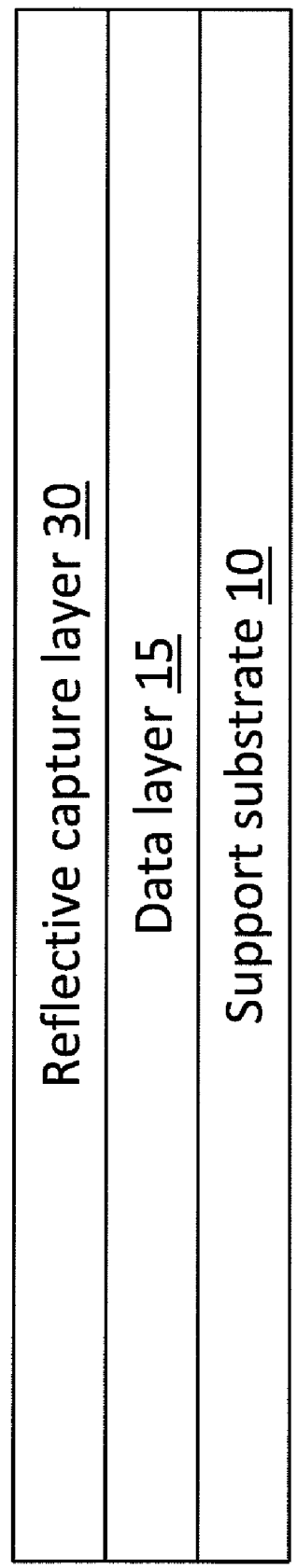
FIG. 1d shows an optical information medium having a support substrate, a data layer, and a reflective capture layer.

The optical information medium can further comprise a reflective layer 25, as shown in FIG. 1c. The reflective layer can be used with or without an ablation capture layer. Alternatively, the reflective layer can function as both a reflective layer and an ablation capture layer (making it a reflective capture layer 30; FIG. 1d). In this case, it provides two distinct write strategies. A first write strategy provides a semi-transparent write layer. As described above, the write-layer transparency is adjusted with increased gas concentrations. A reflective ablation capture layer acts as a mirror, reflecting the read laser at unwritten areas of the data layer. When the write layer is ablated through the write process, a protuberance is created in the reflective ablation capture layer creating an effectual prism preventing the read laser from being directly reflected back to a photodiode detector. Consequently, unwritten areas are more reflective and written areas are more absorptive to the read laser providing the necessary contrast in the read process. A second write strategy provides a minimally reflective data layer by adjusting the thickness such that reflected light from the first and second surfaces is 180 degrees out of phase for destructive interference. The data layer may also be manufactured to be more opaque by decreasing the gas concentration. Additionally, the data layer opacity and thickness may be adjusted for maximum read-laser absorption and destructive light-phase cancellation. The writing process exposes the reflective layer by ablating portions of the write layer. Unwritten areas are opaque or more absorptive, and written areas are reflective, again providing the necessary contrast for the write process.

The reflective layer materials are selected for their extreme durability and reflectivity and may comprise materials such as silicon, silver, titanium, chromium, platinum, rhodium, gold, aluminum, or alloys thereof.

Figure 1E:
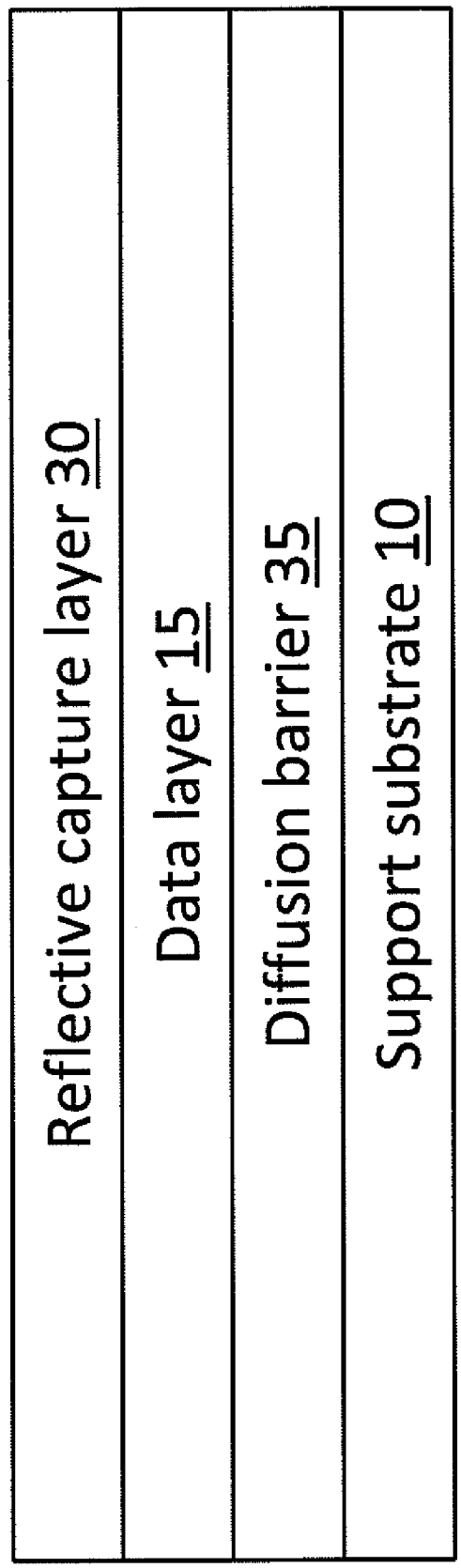
FIG. 1e shows an optical information medium having a support substrate, a diffusion barrier, a data layer, and a reflective capture layer.

The optical information medium can further comprise a diffusion barrier layer 35; FIG. 1e. The diffusion barrier layer may be added between the substrate and the data layer to add an additional layer of protection to the data layer when the substrate consists of polycarbonate materials. Without a diffusion barrier layer, oxygen and moisture readily diffuse through conventional polycarbonate substrates to adversely react with the data layer. Diffusion barrier materials are selected for their durability and imperviousness to gas and moisture and may comprise materials such as silicon oxide, alumina, ceramics, glass, metal oxides, vitreous materials, or other transparent metal oxides. A separate diffusion barrier is not necessary when the substrate comprises these same materials.

Figure 1F:
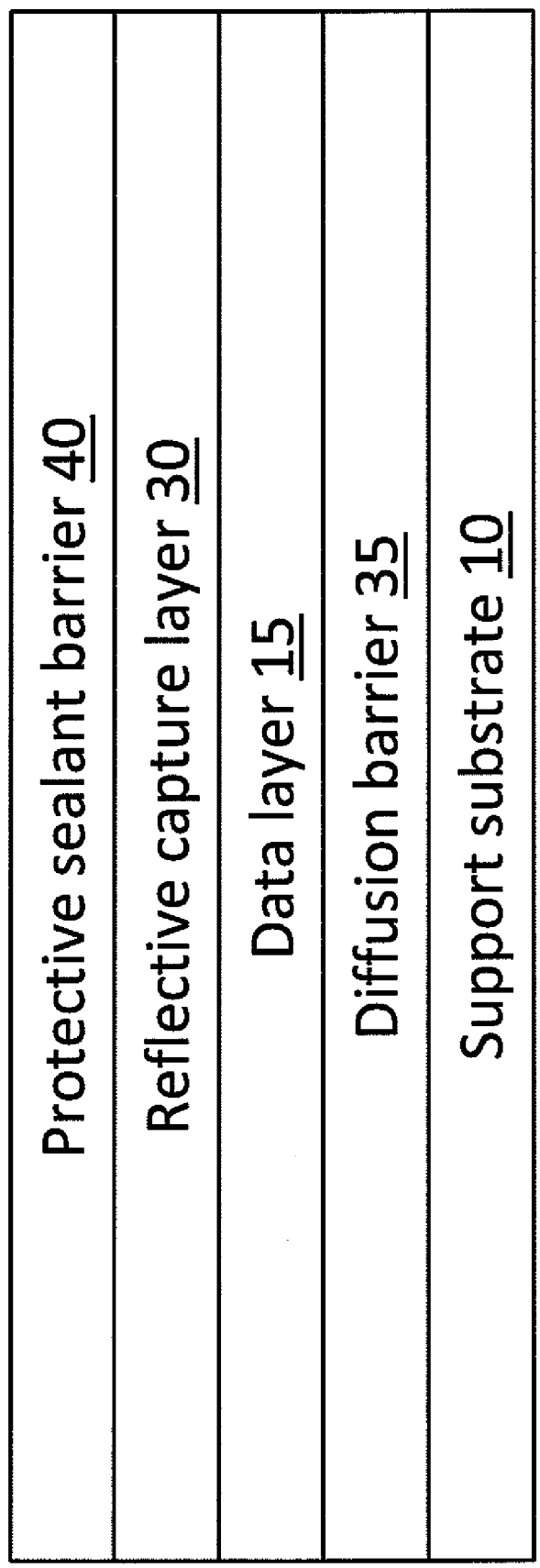
FIG. 1f shows an optical information medium having a support substrate, a diffusion barrier, a data layer, a reflective capture layer, and a protective sealant barrier.

The optical information medium can further comprise a protective sealant barrier layer 40; FIG. 1f. Additional layers may be added above and below the layers described above for additional protection and to increase digital data longevity. A protective sealant barrier layer can comprise materials such as chromium, titanium, silicon oxide, alumina, ceramics, glass, metal oxides, vitreous materials, or a spin-coated polymer. A protective sealant barrier layer is more desirable if the reflective layer comprises reactive materials. The protective sealant barrier layer may also be the reflective layer depending on the materials selected.

The optical information medium can further comprise an ultraviolet-radiation blocking layer 45; FIG. 1g. The ultraviolet-radiation blocking layer may be added below the substrate to prevent substrate hazing or other degradation effects to the data layer. An ultraviolet-radiation blocking layer comprises polycarbonate or glass films containing at least one ultraviolet-radiation blocking agent such as zinc oxide, titanium oxide, silicon carbide, glass, or vitreous materials.

The optical information medium can further comprise a scratch resistant layer 50; FIG. 1g. One of the most common failure modes for optical discs are scratches that cause a decrease in optical read-back signal through both scattering and absorption. Although these scratches are well out of the focal plane of the optical read-back system, they are optically very wide (hundreds or even thousands of tracks wide) and can therefore cause widespread read-back problems. As such, a scratch resistant layer may be applied below the substrate. Scratch-resistant materials comprise silicon oxide, alumina, silicon carbide, or vitreous materials.

The substrate, ultraviolet blocking layer, and scratch resistant layer may be combined as a single material exhibiting all the beneficial characteristics of the individual layers. In other words, the substrate can contain at least one ultraviolet-radiation blocking agent, at least one scratch-resistant material, or both.

The optical information medium can further comprise an environmental protection layer 55; FIG. 1g. The environmental protection layer may be added to prevent dirt, water, or other contaminants from entering the disc structure. Typical environmental protection layers include hydrophobic materials and fluorinated hydrophobic materials.

The optical information medium can contain many different layers arranged in various different configurations. The following are several examples of simple and more complex arrangements of layers in the optical information medium product. These examples are not meant to be exhaustive, as many variations in layers and orders of layer application exist. It is presently preferred that the gas is an oxygenated gas, and that the data layer comprises carbon.

In a most simple embodiment, the medium can comprise at least one support substrate, and at least one data layer infused with a gas such that the support substrate and data layer facially contact each other. In a presently preferred embodiment, the data layer facially contacts one face of the support substrate. In one presently preferred embodiment, the support substrate is polycarbonate. In another presently preferred embodiment, the support substrate is fused silica or glass. In a presently preferred embodiment, the data layer comprises carbon. It is presently preferred that the gas is an oxygenated gas.

In one embodiment, the medium can comprise at least one support substrate, at least one data layer infused with a gas such that the support substrate and the data layer facially contact each other, and at least one ablation capture layer such that the data layer and the ablation capture layer facially contact each other.

In another embodiment, the medium can comprise at least one support substrate, at least one data layer infused with a gas such that the support substrate and the data layer facially contact each other, and at least one reflective capture layer such that the data layer and the reflective capture layer facially contact each other. This is illustrated in FIG. 1c.

In another embodiment, the medium can comprise at least one support substrate, at least one diffusion barrier layer such that the support substrate and the diffusion barrier layer facially contact each other, at least one data layer infused with a gas such that the diffusion barrier layer and the data layer facially contact each other, and at least one reflective capture layer such that the data layer and the reflective capture layer facially contact each other. This is illustrated in FIG. 1e.

In another embodiment, the medium can comprise at least one support substrate, at least one diffusion barrier layer such that the support substrate and the diffusion barrier layer facially contact each other, at least one data layer infused with a gas such that the diffusion barrier layer and the data layer facially contact each other, at least one reflective capture such that the data layer and the reflective capture layer facially contact each other, and at least one protective sealant barrier layer such that the reflective capture layer and the protective sealant barrier layer facially contact each other. This is illustrated in FIG. 1f.

In another embodiment, the medium can comprise at least one support substrate having a first face and a second face, at least one diffusion barrier layer such that the support substrate and the diffusion barrier layer facially contact each other, at least one data layer infused with a gas such that the diffusion barrier layer and the data layer facially contact each other, at least one reflective capture layer such that the data layer and the reflective capture layer facially contact each other, at least one protective sealant barrier layer such that the reflective capture layer and the protective sealant barrier layer facially contact each other, at least one ultraviolet radiation blocking layer such that the support substrate and the ultraviolet radiation blocking layer facially contact each other, at least one scratch resistant layer such that the scratch resistant layer and the ultraviolet radiation blocking layer facially contact each other, and at least one environmental protection layer such that the environmental protection layer and the ultraviolet radiation blocking layer facially contact each other. This is illustrated in FIG. 1g.

In a very specific embodiment, an optical information medium can comprise a polycarbonate, fused silica, or glass support substrate; and an amorphous carbon data layer infused with carbon dioxide.

Methods of Preparation—Carbon Layer

An additional embodiment of the invention relates to methods of preparing an optical information medium. Generally, the method can comprise providing a support substrate, and applying one or more additional layers to prepare the optical information medium.

The various layers can be applied in various orders, depending on the particular layering desired in the optical information medium product. The layers can all be applied on one side of the support substrate, resulting in a final product having the support substrate on one outer face. Alternatively, the layers can be applied onto both sides of the support substrate, resulting in a final product having the support substrate located such that it is not an outer face of the final product.

In a most simple embodiment, the method can comprise providing a support substrate, and applying at least one data layer infused with a gas onto at least one face of the support substrate such that the support substrate and data layer facially contact each other. In a presently preferred embodiment, the data layer is applied to one face of the support substrate. The support substrate can be any of the support substrates discussed above. In one presently preferred embodiment, the support substrate is polycarbonate. In another presently preferred embodiment, the support substrate is fused silica or glass.

The method can further comprise exposing the support substrate to a vacuum prior to the applying step.

Sputtering can be used in the applying step to apply the data layer and other layers. Sputtering to form the data layer can comprise providing a precursor material and at least one gas, applying energy to the precursor material to vaporize precursor material, and depositing the vaporized precursor material and the gas onto the support substrate, such that the gas is infused in the data layer. In a presently preferred embodiment, the precursor material is carbon. The gas can be any gas discussed above. In a presently preferred embodiment, the gas is any of the oxygenated gases discussed above, such as carbon dioxide. Additional non-oxygenated gases may be present during the sputtering, such as argon, krypton, nitrogen, helium, and neon. These gases are commonly used as an inert sputtering carrier gas. Sputtering can be performed using laboratory-scale instruments that typically have a single chamber and one or more targets (such as a PVD 75 instrument from the Kurt J. Lesker Company (Pittsburgh, Pa.)), or can be performed using industrial-scale instruments that have multiple chambers and multiple targets (such as a Sprinter instrument from Oerlikon Systems (Pfäffikon, Switzerland).

The concentration of the gas during sputtering can be about 0.01% (v/v) to about 25% (v/v). Specific concentrations can be about 0.01% (v/v), about 0.05% (v/v), about 0.1% (v/v), about 0.5% (v/v), about 1% (v/v), about 2% (v/v), about 3% (v/v), about 4% (v/v), about 5% (v/v), about 10% (v/v), about 15% (v/v), about 20% (v/v), about 25% (v/v), and ranges between any two of these values. These values are volume/volume with respect to the inert sputtering carrier gas (typically argon).

Methods other than sputtering can be used to apply the data layer and other layers. For example, plasma polymerization, E-beam evaporation, chemical vapor deposition, molecular beam epitaxy, and evaporation can be used.

The applying at least one data layer infused with a gas step can be performed as a single step. Alternatively, the applying step can be performed as two steps of first applying the data layer without the infused gas, and second infusing the data layer with the gas.

In more complex embodiments, one or more additional layers can be applied to the support substrate. The support substrate can have a first face and a second face. The additional layers can be oriented such that they are present extending from the first face, the second face, or both the first face and second face of the support substrate. If the additional layers are present extending from only one face of the support substrate, then the final prepared product will have one face of the support substrate exposed. If the additional layers are present extending from both the first face and the second face of the support substrate, then the final prepared product will not have the support substrate exposed. The one or more additional layers can be oriented symmetrically relative to the support substrate, or asymmetrically relative to the support substrate.

In some embodiments, one or more layers can be applied to the support substrate before applying the data layer onto the outermost layer. For example, the methods can further comprise applying one or more of the following layers: ablation capture layer, reflective capture layer, protective sealant barrier layer, ultraviolet radiation blocking layer, scratch resistant layer, and environmental protection layer.

In some embodiments, certain layers can be applied to a first support substrate, certain layers can be applied to a second support substrate, and the first support substrate and the second support substrate can be facially joined or adhered. This method is particularly attractive for the preparation of DVD media.

The following are particular examples of methods of preparation of multiple-layered optical data mediums. These examples are not meant to be exhaustive, as many variations in layers and orders of layer application exist. In embodiments where layers are applied to both the first face and the second face of the support substrate, the particular order of layer application can be varied to arrive at the same final optical data medium product.

In one embodiment, the method can comprise providing a support substrate, applying at least one data layer infused with a gas onto the support substrate such that the support substrate and the data layer facially contact each other, and applying at least one ablation capture layer onto the data layer such that the data layer and the ablation capture layer facially contact each other.

In another embodiment, the method can comprise providing a support substrate, applying at least one data layer infused with a gas onto the support substrate such that the support substrate and the data layer facially contact each other, and applying at least one reflective capture layer onto the data layer such that the data layer and the reflective capture layer facially contact each other.

In another embodiment, the method can comprise providing a support substrate, applying at least one diffusion barrier layer onto the support substrate such that the support substrate and the diffusion barrier layer facially contact each other, applying at least one data layer infused with a gas onto the diffusion barrier layer such that the diffusion barrier layer and the data layer facially contact each other, and applying at least one reflective capture layer onto the data layer such that the data layer and the reflective capture layer facially contact each other.

In another embodiment, the method can comprise providing a support substrate, applying at least one diffusion barrier layer onto the support substrate such that the support substrate and the diffusion barrier layer facially contact each other, applying at least one data layer infused with a gas onto the diffusion barrier layer such that the diffusion barrier layer and the data layer facially contact each other, applying at least one reflective capture layer onto the data layer such that the data layer and the reflective capture layer facially contact each other, and applying at least one protective sealant barrier layer such that the reflective capture layer and the protective sealant barrier layer facially contact each other.

In another embodiment, the method can comprise providing a support substrate having a first face and a second face, applying at least one diffusion barrier layer onto the first face of the support substrate such that the support substrate and the diffusion barrier layer facially contact each other, applying at least one data layer infused with a gas onto the diffusion barrier layer such that the diffusion barrier layer and the data layer facially contact each other, applying at least one reflective capture layer onto the data layer such that the data layer and the reflective capture layer facially contact each other, applying at least one protective sealant barrier layer onto the reflective capture layer such that the reflective capture layer and the protective sealant barrier layer facially contact each other, applying at least one ultraviolet radiation blocking layer onto the second face of the support substrate such that the support substrate and the ultraviolet radiation blocking layer facially contact each other, applying at least one scratch resistant layer onto the ultraviolet radiation blocking layer such that the scratch resistant layer and the ultraviolet radiation blocking layer facially contact each other, and applying at least one environmental protection layer onto the scratch resistant layer such that the environmental protection layer and the scratch resistant layer facially contact each other.

Materials—Carbon Layer Adjacent to Data Layer

One embodiment of the present invention comprises an optical information medium suitable for archival purposes. The materials and manufacturing processes are designed to be very durable and not subject to age-degradation effects to a substantial degree. Likewise, the information writing process is intended to be permanent and not subject to age degradation effects to a substantial degree. The medium comprises at least one data layer 60, at least one carbon layer 65, and at least one support substrate 10. While it is presently preferred that the carbon layer and the data layer be in facial contact, at least one intervening layer can be disposed between them.

The presence of the carbon layer can confer multiple favorable properties to the optical information medium. The carbon layer can act as a thermal capacitor, facilitating heat transfer away from the data layer. This is especially useful when high power lasers are used to write data in the data layer. High power lasers can create high local heat blooms that, if not dissipated, can damage or degrade adjacent data. In extreme cases, heat blooms can damage the substrate grooves used in data tracking during subsequent reading steps. The carbon layer can also act as a permeability barrier, limiting exposure of the data layer to oxygen, water vapor, and other agents that can oxidize or otherwise degrade the data layer materials. A carbon layer can be more flexible than materials traditionally used in dielectric layers, and the flexibility can be "tuned" by incorporation of gas or other materials. This flexibility confers reduced stress, can reduce or eliminate cracking, and can reduce or eliminate undesired separation of the carbon layer from adjacent layers. Carbon is also a refractory material with a high melting point, which also assists in resisting the instantaneous high temperatures that can be reached when high-powered lasers are used to write data to a data layer.

The data layer can generally be any material or materials suitable for writing data to, and reading data from using a suitable device such as a disc drive. The carbon layer can generally be used with any data layer to form various embodiments of the instant invention. Examples of materials used in data layers include organic dyes, metals, metal alloys, metal oxides, glasses, and ceramics.

The data layer can generally be any thickness. An example lower thickness limit can be about 2 nm. An example upper thickness limit can be about 250 nm. Example thicknesses are about 2 nm, about 4 nm, about 6 nm, about 8 nm, about 10 nm, about 12 nm, about 14 nm, about 16 nm, about 18 nm, about 20 nm, about 22 nm, about 24 nm, about 25 nm, about 26 nm, about 28 nm, about 30 nm, about 32 nm, about 34 nm, about 35 nm, about 36 nm, about 38 nm, about 40 nm, about 50 nm, about 60 nm, about 70 nm, about 80 nm, about 90 nm, about 100 nm, about 110 nm, about 120 nm, about 130 nm, about 140 nm, about 150 nm, about 160 nm, about 170 nm, about 180 nm, about 190 nm, about 200 nm, about 210 nm, about 220 nm, about 230 nm, about 240 nm, about 250 nm, and ranges between any two of these values.

The carbon layer can comprise, consist essentially of, or consist of elemental carbon (C). Examples of elemental carbon include amorphous carbon, graphitic amorphous carbon, tetrahedral amorphous carbon, diamond-like amorphous carbon, polymer-like amorphous carbon, glass-like carbon, diamond-like carbon, and carbon black. The use of a carbon layer can provide improved adhesion between adjacent layers, relative to an otherwise identical optical information medium lacking the carbon layer.

If the optical information medium comprises more than one carbon layer, they can independently be the same or different.

The carbon layer can lack an infused gas. Alternatively, the carbon layer can further comprise at least one infused gas. The term "infused" refers to at least one gas that is covalently bonded, entrapped, or adsorbed into or onto the carbon material layer. The gas can lack oxygen atoms or contain oxygen atoms. Examples of a gas that lacks oxygen atoms include molecular hydrogen ($H_2$), molecular nitrogen ($N_2$), helium (He), argon (Ar), neon (Ne), krypton (Kr), xenon (Xe), chlorine ($Cl_2$), and fluorine ($F_2$). Examples of a gas that contains at least one oxygen atom include carbon monoxide (CO), carbon dioxide ($CO_2$), molecular oxygen ($O_2$), ozone ($O_3$), nitrogen oxides ($NO_x$), and sulfur oxides ($SO_x$). A specific embodiment can include carbon dioxide ($CO_2$) as an infused gas. An alternative specific embodiment can include molecular hydrogen ($H_2$) as an infused gas. Alternatively, various hydrocarbon compounds such as methane, ethane, propane, or acetylene can be used to introduce hydrogen gas into the carbon layer.

Alternatively, the carbon layer can further comprise an additional solid such as aluminum.

The carbon layer can generally be any thickness. A lower thickness limit can be about one monolayer of carbon. An alternative lower thickness limit can be about 10 nm. An upper thickness limit can be about 200 nm. Example thicknesses include about 1 nm, about 2 nm, about 3 nm, about 4 nm, about 5 nm, about 10 nm, about 15 nm, about 20 nm, about 30 nm, about 40 nm, about 50 nm, about 60 nm, about 70 nm, about 80 nm, about 90 nm, about 100 nm, about 110 nm, about 120 nm, about 130 nm, about 140 nm, about 150 nm, about 160 nm, about 170 nm, about 180 nm, about 190 nm, about 200 nm, and ranges between any two of these values.

The carbon layer is preferably immiscible with adjacent layers in the optical information medium. The carbon layer preferably adheres to adjacent layers in the optical information medium. The carbon layer is preferably substantially free of stress in order to facilitate flatness of the optical information medium, and long-term cohesion of the medium.

The optical information medium can comprise a first support substrate and a second support substrate. The first support substrate and second support substrate can be made of the same material, or can be made of different materials. The first support substrate and the second support substrate typically are oriented such that they form the outer two layers of the optical information medium (i.e. are the first and last layers when viewed as a cross section). This is especially true in a DVD-type format.

The support substrate can facially contact the data layer or the carbon layer. Alternatively, there can be at least one intervening layer between either the support substrate and the data layer or the support substrate and the carbon layer. These arrangements of layers are graphically shown in FIGS. 2a-2d.

Figure 2A:
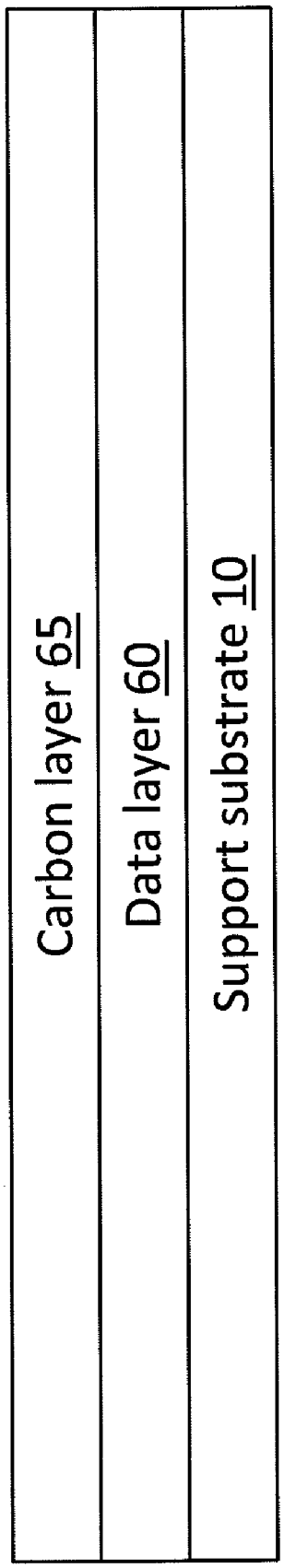
FIG. 2a shows an optical information medium having a support substrate, a data layer, and a carbon material layer.
Figure 2B:
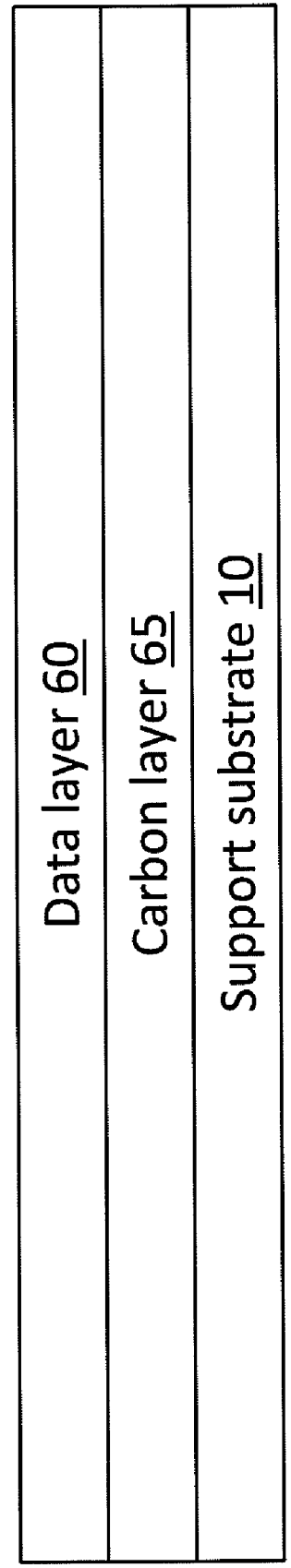
FIG. 2b shows an optical information medium having a support substrate, a carbon material layer, and a data layer.
Figure 2C:
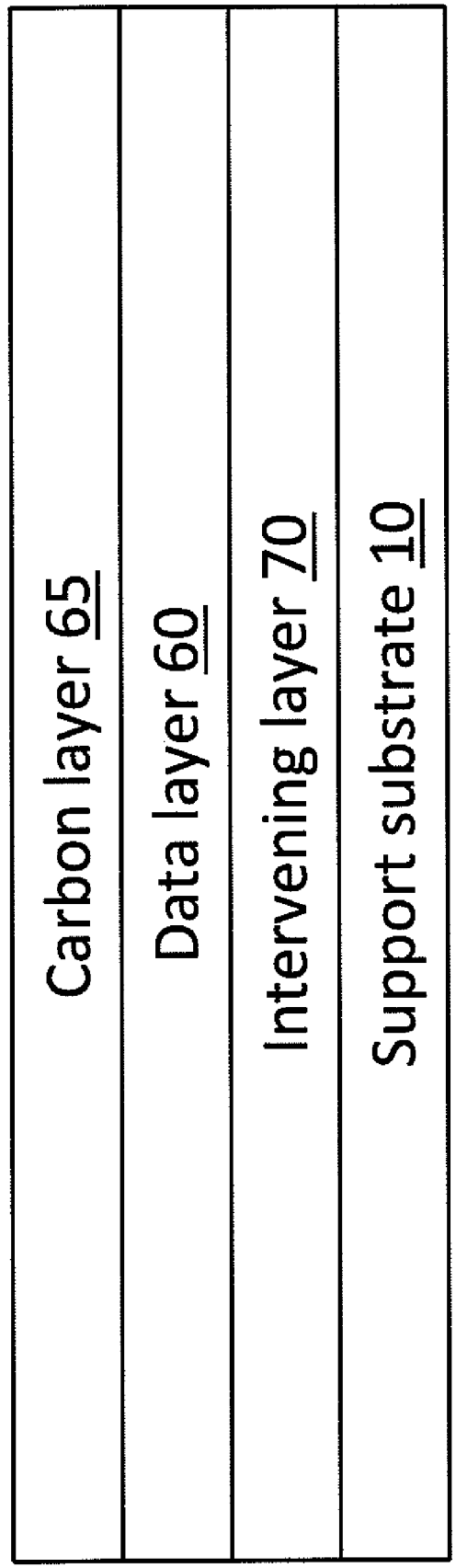
FIG. 2c shows an optical information medium having a support substrate, at least one intervening layer, a data layer, and a carbon material layer.
Figure 2D:
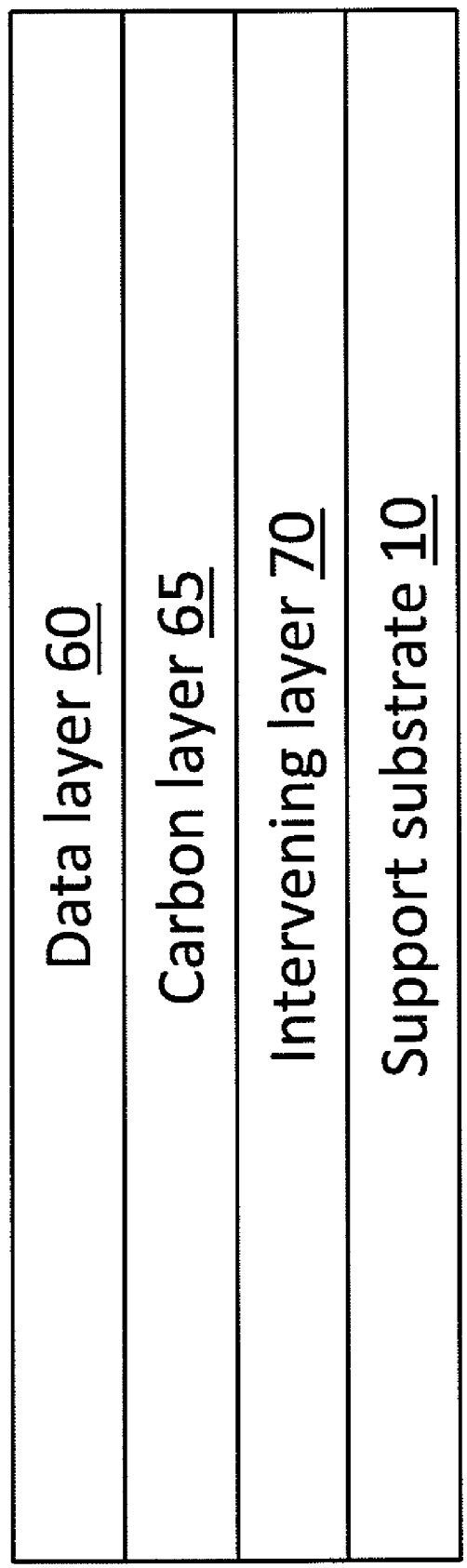
FIG. 2d shows an optical information medium having a support substrate, at least one intervening layer, a carbon material layer, and a data layer.

In the embodiment shown in FIG. 2a, a cross section would first intersect the support substrate, then the data layer, and then the carbon layer. FIG. 2b shows an alternative orientation of the data layer and the carbon layer relative to the substrate layer. In this figure, a cross section would first intersect the support substrate, then the carbon layer, and then the data layer. In the embodiment shown in FIG. 2c, a cross section would first intersect the support substrate, then the at least one intervening layer, then the data layer, and then the carbon layer. FIG. 2d shows an alternative orientation of the data layer and the carbon layer relative to the substrate layer. In this figure, a cross section would first intersect the support substrate, then the at least one intervening layer, then the carbon layer, and then the data layer An example of an intervening layer is a thermal barrier layer. A thermal barrier can protect the substrate from heat generated during writing data to the metal material layer. Examples of thermal barrier layers include glasses, ceramics, nitrides, and metal oxides. Specific examples include silica ($SiO_2$), silica-zinc sulfide ($SiO_2$ ZnS), silicon nitride (SiN), carbon, alumina, silicon, silicon nitride, boron nitride, titanium oxides ($TiO_x$), and tantalum oxides ($TaO_x$). Other refractory materials can be used, provided they can be deposited into a thin film layer with suitable adhesion properties. Alternatively, a metal layer can be used as a thermal barrier layer due to its enhanced heat conductivity as compared to that of a dielectric layer. Use of a metal layer would allow conduction of heat away from a data site quickly, rather than having the heat absorbed and dissipated gradually over time.

Figure 3A:
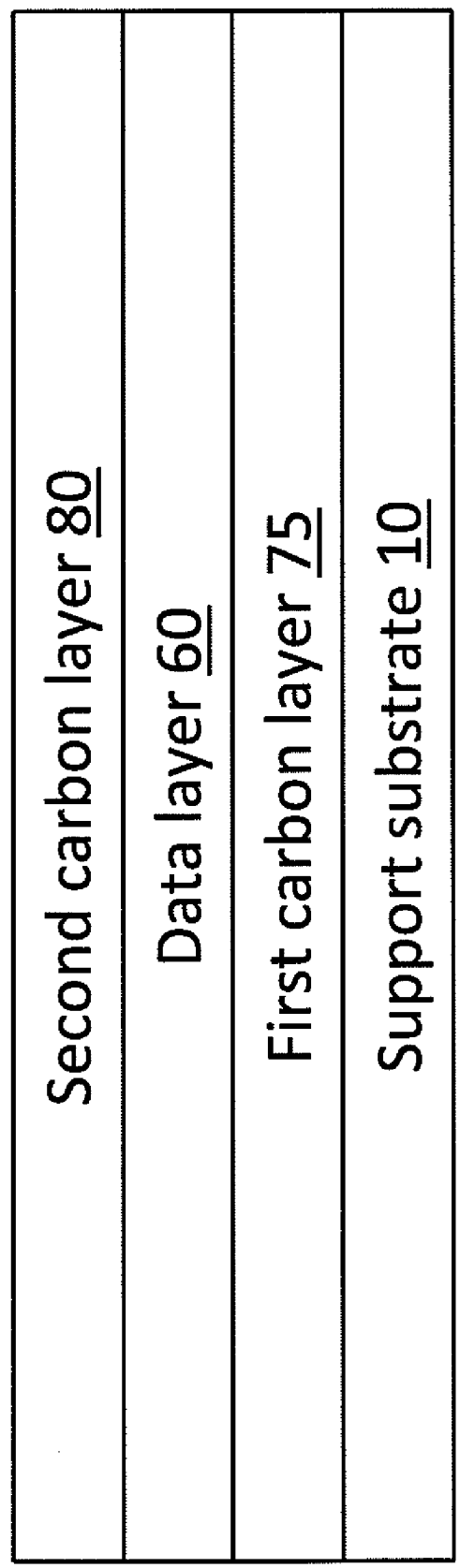
FIG. 3a shows an optical information medium having a support substrate, a first carbon material layer, a data layer, and a second carbon material layer.

The data layer can be "sandwiched" between two carbon layers. In this case, the data layer facially contacts both the first carbon layer 75 and the second carbon layer 80. An example of this is shown in FIG. 3a. In this figure, a cross section would first intersect the support substrate, then the first carbon layer, then the data layer, then the second carbon layer.

Figure 3B:
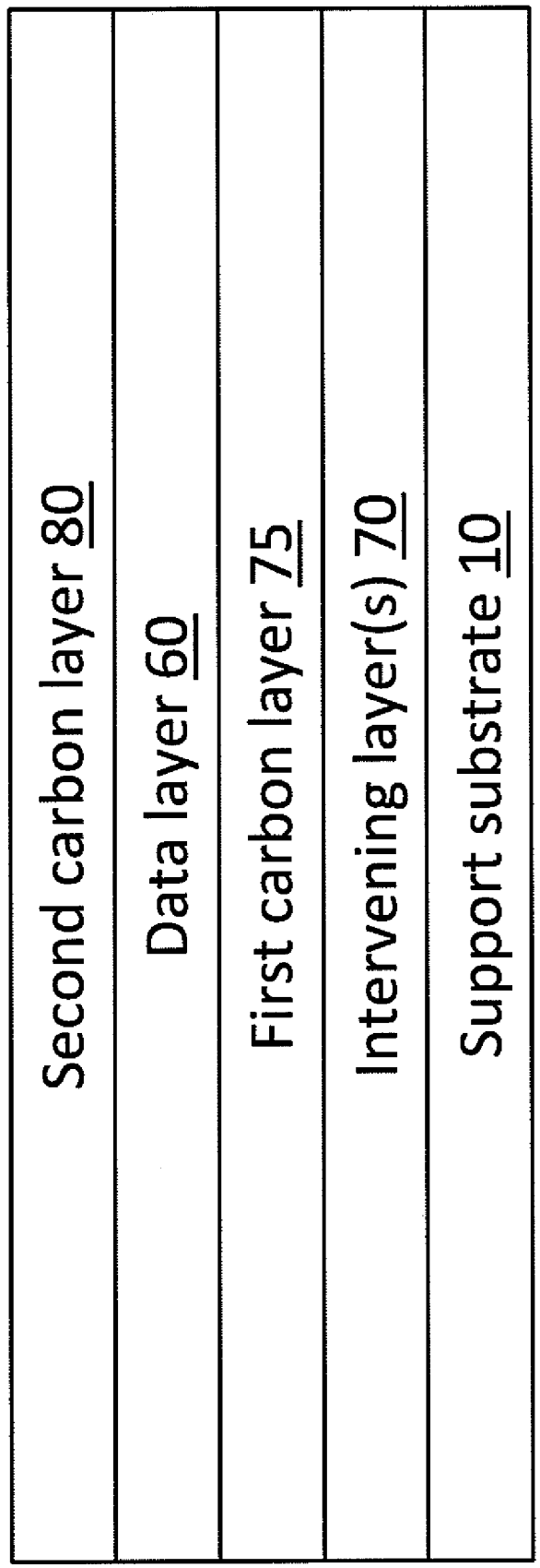
FIG. 3b shows an optical information medium having a support substrate, at least one intervening layer, a first carbon material layer, a data layer, and a second carbon material layer.

An alternative embodiment is shown in FIG. 3b. In this figure, a cross section would first intersect the support substrate, then the at least one intervening layer, then the first carbon layer, then the data layer, then the second carbon layer.

Figure 3C:
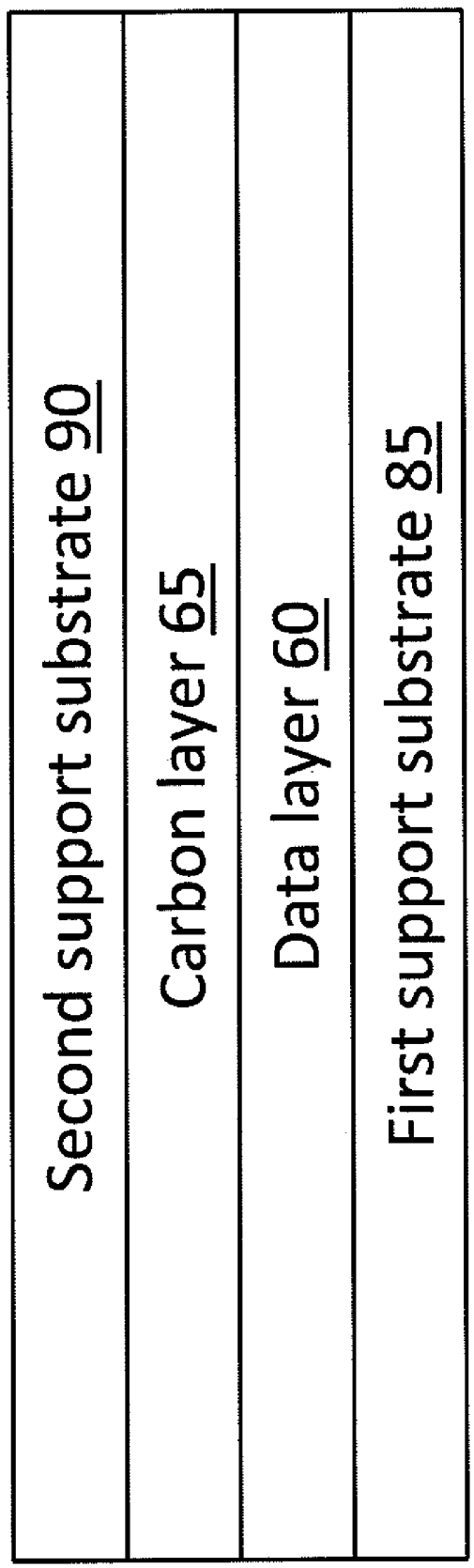
FIG. 3c shows an optical information medium having a first support substrate, a data layer, a carbon material layer, and a second support substrate.
Figure 3D:
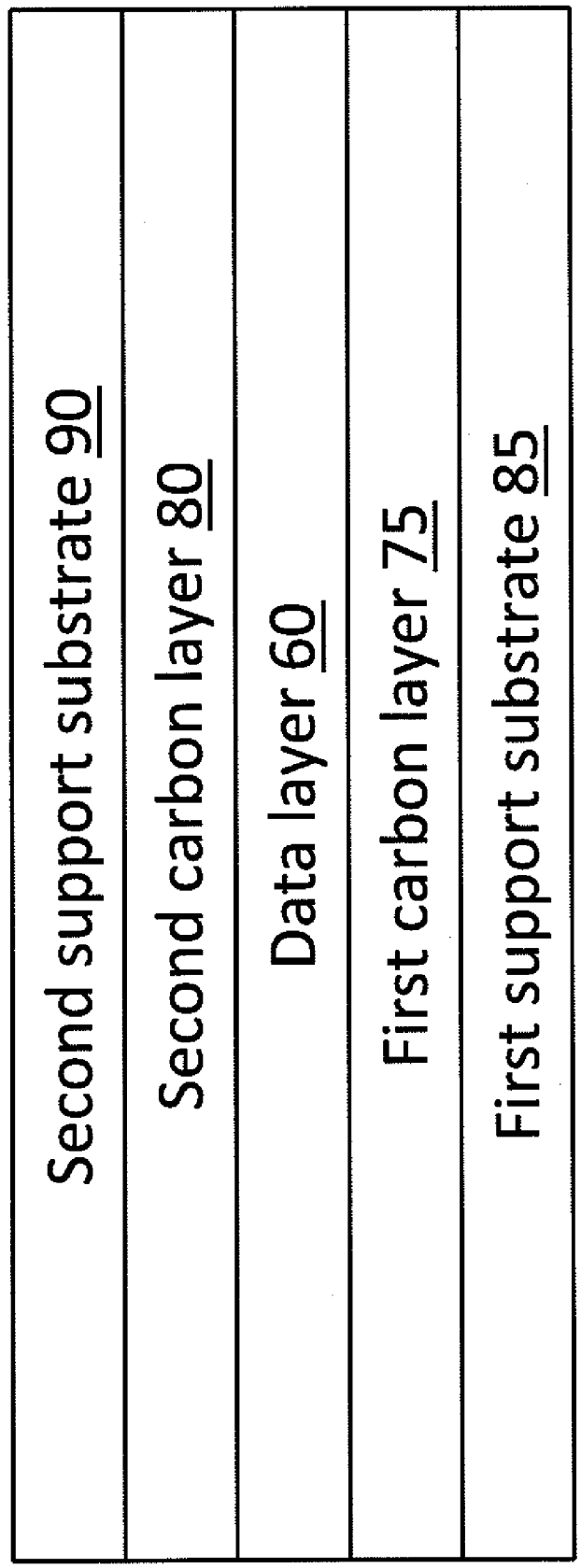
FIG. 3d shows an optical information medium having a first support substrate, a first carbon material layer, a data layer, a second carbon material layer, and a second support substrate.

Alternative embodiments comprising a first support substrate and a second support substrate are shown in FIGS. 3c and 3d. In FIG. 3c, a cross section would first intersect the first support substrate 85, then the data layer 60, then the carbon layer 65, then the second support substrate 90. In FIG. 3d, a cross section would first intersect the first support substrate 85, then the first carbon layer 75, then the data layer 60, then the second carbon layer 80, then the second support substrate 90.

Figure 3E:
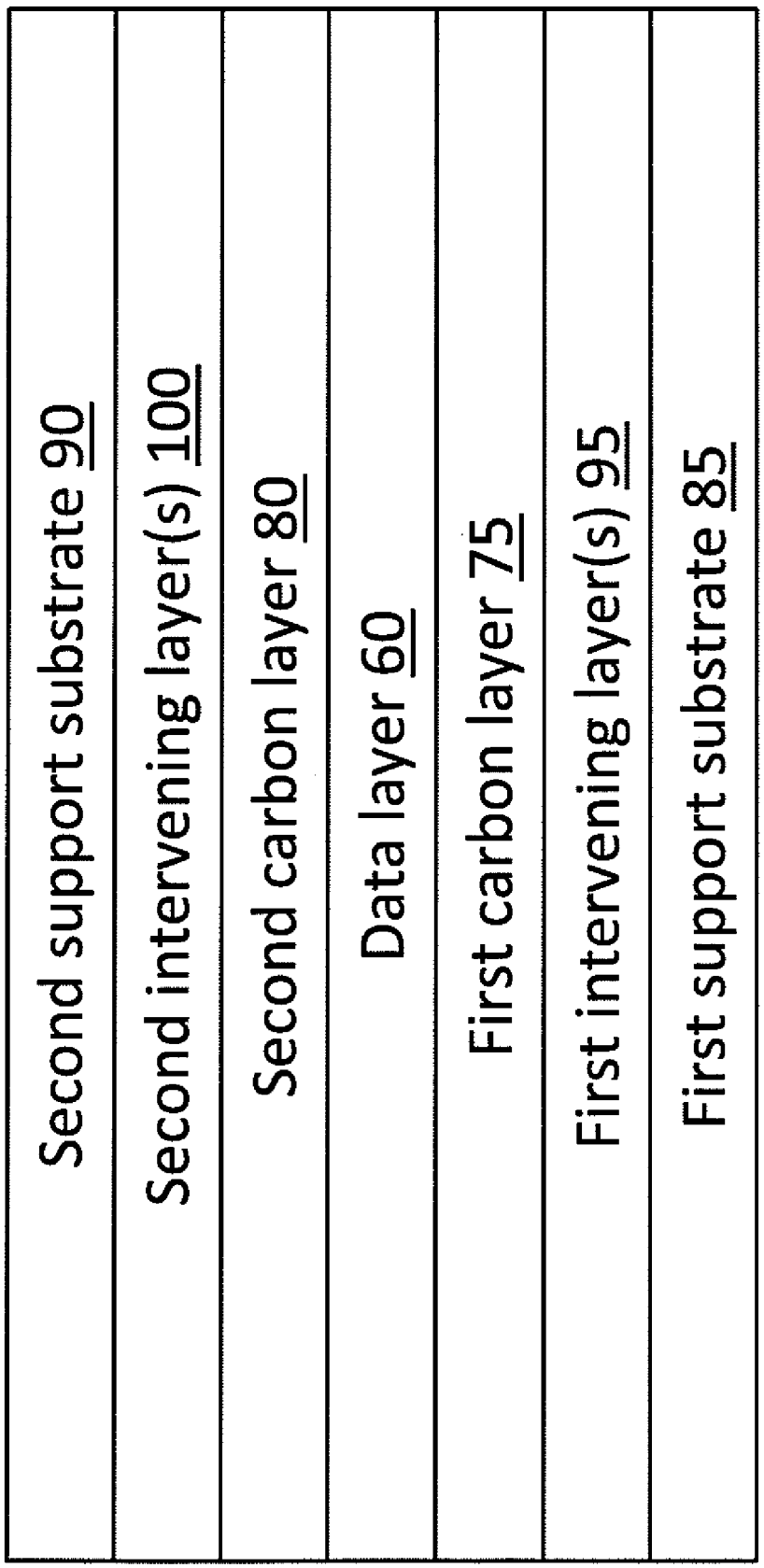
FIG. 3e shows an optical information medium having a first support substrate, a first intervening layer, a first carbon material layer, a data layer, a second carbon material layer, a second intervening layer, and a second support substrate.

Yet another alternative embodiment comprising multiple support substrates and multiple intervening layers is shown in FIG. 3e. In FIG. 3e, a cross section would first intersect the first support substrate 85, then the first one or more intervening layers 95, then the first carbon layer 75, then the data layer 60, then the second carbon layer 80, then the second one or more intervening layers 100, then the second support substrate 90.

The optical information medium can further comprise additional layers such as at least one reflective layer, at least one external protection layer, at least one heat sink layer, at least one optical tuning layer, or at least one adhesion layer. Other layers can be added to tune the optical behavior of the optical information medium by increasing the optical path length to modulate the reflectivity of the structure by means of constructive or destructive interference.

The data layer can further comprise one or more sites to which data has been written. The sites exhibit a detectable difference from other sites to which data has not been written.

Methods of Preparation—Carbon Layer Dielectric

Additional embodiments of the invention are directed towards methods of preparing an optical information medium.

The various layers can be applied in various orders, depending on the particular layering desired in the optical information medium product. The layers can all be applied on one side of the support substrate, resulting in a final product having the support substrate on one outer face. Alternatively, the layers can be applied onto both sides of the support substrate, resulting in a final product having the support substrate located such that it is not an outer face of the final product. While it is presently preferred that the carbon layer and the data layer be in facial contact, at least one intervening layer can be disposed between them.

In one embodiment, the method can comprise providing a support substrate, applying a data layer such that the data layer facially contacts the support substrate, and applying a carbon layer such that the carbon layer facially contacts the data layer. Performing this method can produce an optical information medium such as the one shown in FIG. 2a.

In an alternative embodiment, the method can comprise providing a support substrate, applying a carbon layer such that the carbon layer facially contacts the support substrate, and applying a data layer such that the data layer facially contacts the carbon layer. Performing this method can produce an optical information medium such as the one shown in FIG. 2b.

In an alternative embodiment, the method can comprise providing a support substrate, applying at least one intervening layer such that the intervening layer facially contacts the support substrate, applying a data layer such that the data layer facially contacts the intervening layer, and applying a carbon layer such that the carbon layer facially contacts the data layer. Performing this method can produce an optical information medium such as the one shown in FIG. 2c.

In an alternative embodiment, the method can comprise providing a support substrate, applying at least one intervening layer such that the intervening layer facially contacts the support substrate, applying a carbon layer such that the carbon layer facially contacts the intervening layer, and applying a data layer such that the data layer facially contacts the carbon layer. Performing this method can produce an optical information medium such as the one shown in FIG. 2d.

In yet another alternative embodiment, the method can comprise providing a support substrate; applying a first carbon layer, such that the first carbon layer facially contacts the support substrate; applying a data layer, such that the data layer facially contacts the first carbon layer; and applying a second carbon layer, such that the second carbon material layer facially contacts the data layer. Performing this method can produce an optical information medium such as the one shown in FIG. 3a.

In yet another alternative embodiment, the method can comprise providing a support substrate; applying at least one intervening layer such that the intervening layer facially contacts the support substrate; applying a first carbon layer, such that the first carbon layer facially contacts the intervening layer; applying a data layer, such that the data layer facially contacts the first carbon layer; and applying a second carbon layer, such that the second carbon material layer facially contacts the data layer. Performing this method can produce an optical information medium such as the one shown in FIG. 3b.

In one embodiment, the method can comprise providing a first support substrate, applying a data layer such that the data layer facially contacts the first support substrate, applying a carbon layer such that the carbon layer facially contacts the data layer; and applying a second support substrate such that the second support substrate facially contacts the carbon layer. Performing this method can produce an optical information medium such as the one shown in FIG. 3c.

In yet another alternative embodiment, the method can comprise providing a first support substrate; applying a first carbon layer, such that the first carbon layer facially contacts the first support substrate; applying a data layer, such that the data layer facially contacts the first carbon layer; applying a second carbon layer, such that the second carbon material layer facially contacts the data layer; and applying a second support substrate, such that the second support substrate facially contacts the second carbon layer. Performing this method can produce an optical information medium such as the one shown in FIG. 3d.

In yet another alternative embodiment, the method can comprise providing a first support substrate; applying at least one first intervening layer such that the first intervening layer facially contacts the first support substrate; applying a first carbon layer, such that the first carbon layer facially contacts the first intervening layer; applying a data layer, such that the data layer facially contacts the first carbon layer; applying a second carbon layer, such that the second carbon layer facially contacts the data layer; applying at least one second intervening layer such that the second intervening layer facially contacts the second carbon layer; and applying a second support substrate, such that the second support substrate facially contacts the second carbon layer. Performing this method can produce an optical information medium such as the one shown in FIG. 3e.

The applying step can comprise physical vapor deposition (such as sputtering, reactive sputtering, e-beam evaporation, and laser ablation of a target), or chemical vapor deposition. Sputtering can be performed using laboratory-scale instruments that typically have a single chamber and one or more targets (such as a PVD 75 instrument from the Kurt J. Lesker Company (Pittsburgh, Pa.)), or can be performed using industrial-scale instruments that have multiple chambers and multiple targets (such as a Sprinter instrument from Oerlikon Systems (Pfäffikon, Switzerland).

Materials—Carbon Layer and Metal Data Layer Assembly

One embodiment of the present invention comprises an optical information medium suitable for archival purposes. The materials and manufacturing processes are designed to be very durable and not subject to age-degradation effects to a substantial degree. Likewise, the information writing process is intended to be permanent and not subject to age degradation effects to a substantial degree. The medium comprises at least one metal material layer 105, at least one carbon material layer 65, and at least one support substrate 10.

The metal material layer comprises, consists essentially of, or consists of at least one metal or metal alloy. The metal material layer can contain mixtures of two or more metals or metal alloys. Examples of metals and alloys include tellurium, tellurium alloys, selenium, selenium alloys, arsenic, arsenic alloys, tin, tin alloys, bismuth, bismuth alloys, antimony, antimony alloys, lead, and lead alloys. Examples of tellurium alloys include $Te_xSe_{100-x}$, $Te_xSe_{100-x}$ (where X is less than or equal to 95), $Te_{86}Se_{14}$, $Te_{79}Se_{21}$, $Te_xSb_{100-x}$, $Te_xSb_{100-x}$ (where X is less than or equal to 95), $Te_xSe_ySb_z$, $Te_xSe_ySb_z$ (where X+Y+Z=100), $Te_xSe_ySb_z$ (where X+Y+Z=100, Y is 10-30, and Z is 5-20), $Te_{75}Se_{20}Sb_5$, $Te_{72.5}Se_{20}Sb_{7.5}$, $Te_xSe_yIn_z$, $Te_xSe_yIn_z$ (where X+Y+Z=100), $Te_xSe_yIn_z$ (where X+Y+Z=100, Y is 10-30, and Z is 5-20), $Te_{75}Se_{20}In_5$, $Te_{72.5}Se_{20}In_{7.5}$, $Te_xSe_yPb_z$ (where X+Y+Z=100), $Te_xSe_yPb_z$ (where X+Y+Z=100, Y is 10-30, and Z is 5-20), $Te_{75}Se_{20}Pb_5$, $Te_{72.5}Se_{20}Pb_{7.5}$, $Te_xSe_ySn_z$, $Te_xSe_ySn_z$ (where X+Y+Z=100), $Te_xSe_ySn_z$ (where X+Y+Z=100, Y is 10-30, and Z is 5-20), $Te_{75}Se_{20}Sn_5$, $Te_{72.5}Se_{20}Sn_{7.5}$, $Te_xSe_yBi_z$, $Te_xSe_yBi_z$ (where X+Y+Z=100), $Te_xSe_yBi_z$ (where X+Y+Z=100, Y is 10-30, and Z is 5-20), $Te_{75}Se_{20}Bi_5$, $Te_{72.5}Se_{20}Bi_{7.5}$, TeGeAs, TeGeSbS, $TeO_xGe$, $TeO_xSn$, Pb—Te—Se, Pb—Te—Sb, As—Te, and Ge—Te. Examples of other alloys include As—Se, Ge—Se, GeS, SnS, Sb—S, $Bi_xSb_{100-x}$, $Bi_xSb_{100-x}$ (where X is less than or equal to 95). Other examples of alloys include GeS, $As_2S_3$, SnS, $Sb_2S_3$, $Sb_{20}S_{80}$, GeSe, $As_2Se_3$, SnSe, $Sb_2Se_3$, $Bi_2Se_3$, GeTe, $Ge_{10}Te_{90}$, $As_2Te_3$, SnTe, $Sb_2Te_3$, PbTe, $Bi_2Te_3$, $As_{10}Te_{90}$, $As_{32}Te_{68}$, $InTe_3$, $In_2S_3$, CdTe, and $In_2Se_3$. Additional metals and alloys include nickel (Ni), chromium (Cr), titanium (Ti), stainless steel, gold (Au), platinum (Pt), palladium (Pd), Monel (an alloy of nickel, copper, and iron commonly used in marine applications), silicon (Si), AuSi, CuNi, and NiCr.

Presently preferred metal material layers comprise chromium, tellurium, or tellurium alloys.

The metal material layer can generally be any thickness. An example lower thickness limit can be about 2 nm. An example upper thickness limit can be about 250 nm. Example thicknesses are about 2 nm, about 4 nm, about 6 nm, about 8 nm, about 10 nm, about 12 nm, about 14 nm, about 16 nm, about 18 nm, about 20 nm, about 30 nm, about 40 nm, about 50 nm, about 60 nm, about 70 nm, about 80 nm, about 90 nm, about 100 nm, about 110 nm, about 120 nm, about 130 nm, about 140 nm, about 150 nm, about 160 nm, about 170 nm, about 180 nm, about 190 nm, about 200 nm, about 210 nm, about 220 nm, about 230 nm, about 240 nm, about 250 nm, and ranges between any two of these values.

The carbon material layer comprises, consists essentially of, or consists of at least one carbon compound. Examples of carbon compounds include amorphous carbon, glass-like carbon, diamond-like carbon, and carbon black.

If the optical information medium comprises more than one carbon material layer, they can independently be the same or different.

The carbon material layer can lack an infused gas. Alternatively, the carbon material layer can further comprise at least one infused gas. The term "infused" refers to at least one gas that is covalently bonded, entrapped, or adsorbed into or onto the carbon material layer. The gas can lack oxygen atoms or contain oxygen atoms. Examples of a gas that lacks oxygen atoms include molecular hydrogen ($H_2$), molecular nitrogen ($N_2$), helium (He), argon (Ar), neon (Ne), krypton (Kr), xenon (Xe), chlorine ($Cl_2$), and fluorine ($F_2$). Examples of a gas that contains at least one oxygen atom include carbon monoxide (CO), carbon dioxide ($CO_2$), molecular oxygen ($O_2$), ozone ($O_3$), nitrogen oxides ($NO_x$), and sulfur oxides ($SO_x$). A specific embodiment can include carbon dioxide ($CO_2$) as an infused gas. An alternative specific embodiment can include molecular hydrogen ($H_2$) as an infused gas.

The carbon layer can generally be any thickness. A lower thickness limit can be about one monolayer of carbon. An alternative lower thickness limit can be about 10 nm. An upper thickness limit can be about 200 nm. Example thicknesses include about 1 nm, about 2 nm, about 3 nm, about 4 nm, about 5 nm, about 10 nm, about 15 nm, about 20 nm, about 30 nm, about 40 nm, about 50 nm, about 60 nm, about 70 nm, about 80 nm, about 90 nm, about 100 nm, about 110 nm, about 120 nm, about 130 nm, about 140 nm, about 150 nm, about 160 nm, about 170 nm, about 180 nm, about 190 nm, about 200 nm, and ranges between any two of these values. A presently preferred thickness is about 19 nm for a first carbon layer and about 13 nm for a second carbon layer.

The optical information medium can comprise a first support substrate and a second support substrate. The first support substrate and second support substrate can be made of the same material, or can be made of different materials. The first support substrate and the second support substrate typically are oriented such that they form the outer two layers of the optical information medium (i.e. are the first and last layers when viewed as a cross section). This is especially true in a DVD-type format.

Figure 4A:
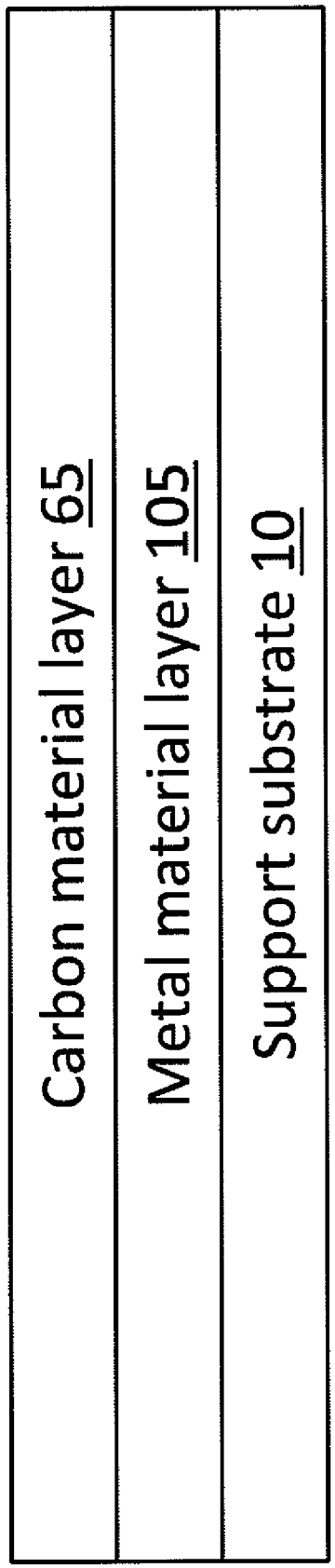
FIG. 4a shows an optical information medium having a support substrate, a metal material layer, and a carbon material layer.
Figure 4B:
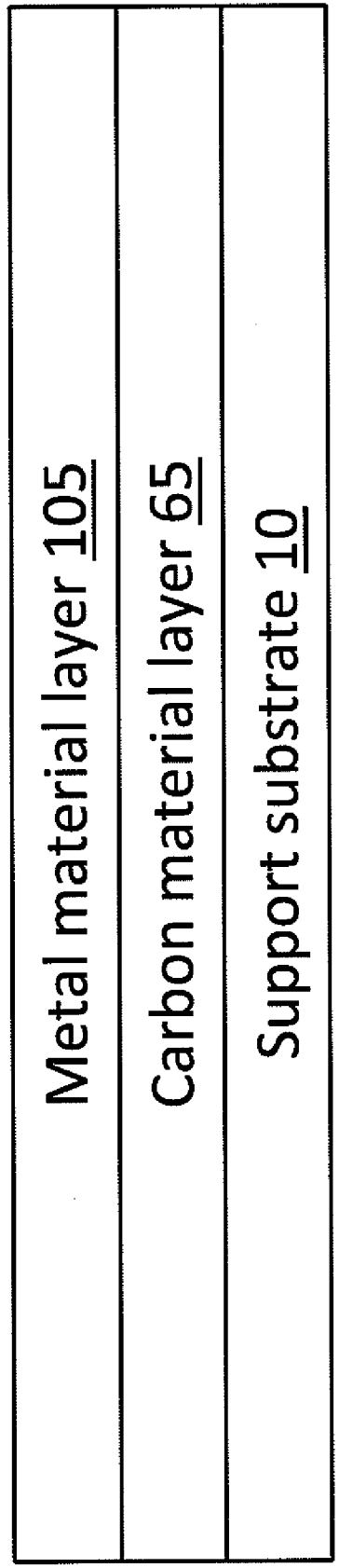
FIG. 4b shows a variation of the optical information medium shown in FIG. 4a, where the positions of the metal material layer and carbon material layer are reversed relative to the support substrate. The optical information medium has a support substrate, a carbon material layer, and a metal material layer.
Figure 4C:
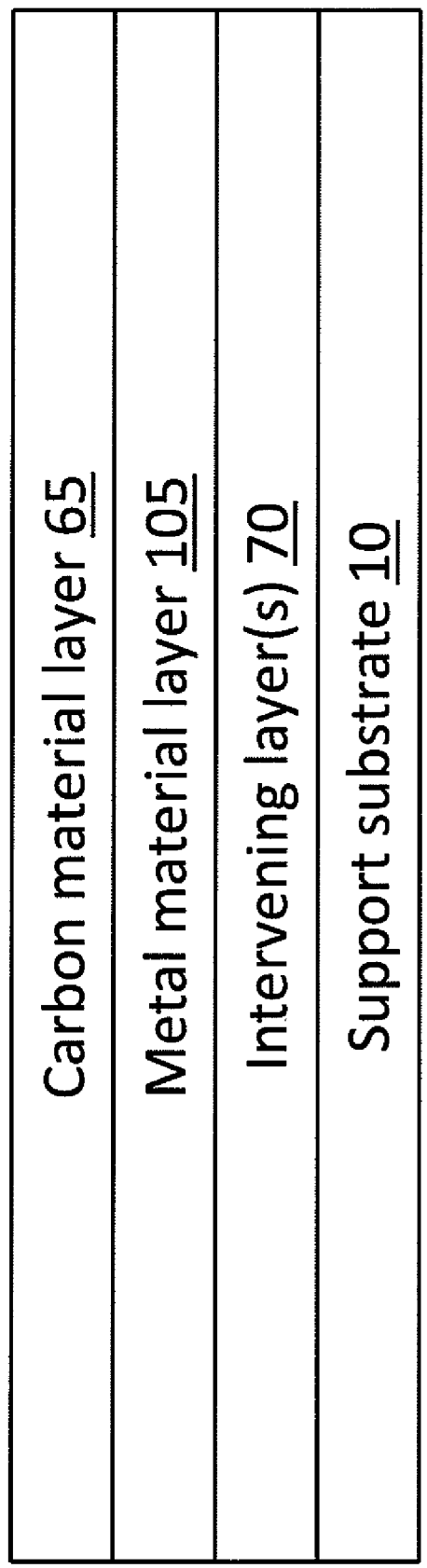
FIG. 4c shows an optical information medium having a support substrate, one or more intervening layers, a metal material layer, and a carbon material layer.

The support substrate can facially contact the metal material layer, or there can be at least one intervening layer between them. The metal material layer can facially contact the carbon material layer. These arrangements of layers are graphically shown in FIGS. 4a-4d. In the embodiment shown in FIG. 4a, a cross section would first intersect the support substrate 10, then the metal material layer 105, and then the carbon material layer 65. FIG. 4b shows an alternative orientation of the metal material layer and the carbon material layer relative to the substrate layer. In this figure, a cross section would first intersect the support substrate 10, then the carbon material layer 65, and then the metal material layer 105. In the embodiment shown in FIG. 4c, a cross section would first intersect the support substrate 10, then the at least one intervening layer 70, then the metal material layer 105, and then the carbon material layer 65.

An example of an intervening layer is a thermal barrier layer. A thermal barrier can protect the substrate from heat generated during writing data to the metal material layer. Examples of thermal barrier layers include silica ($SiO_2$) or carbon.

Figure 4D:
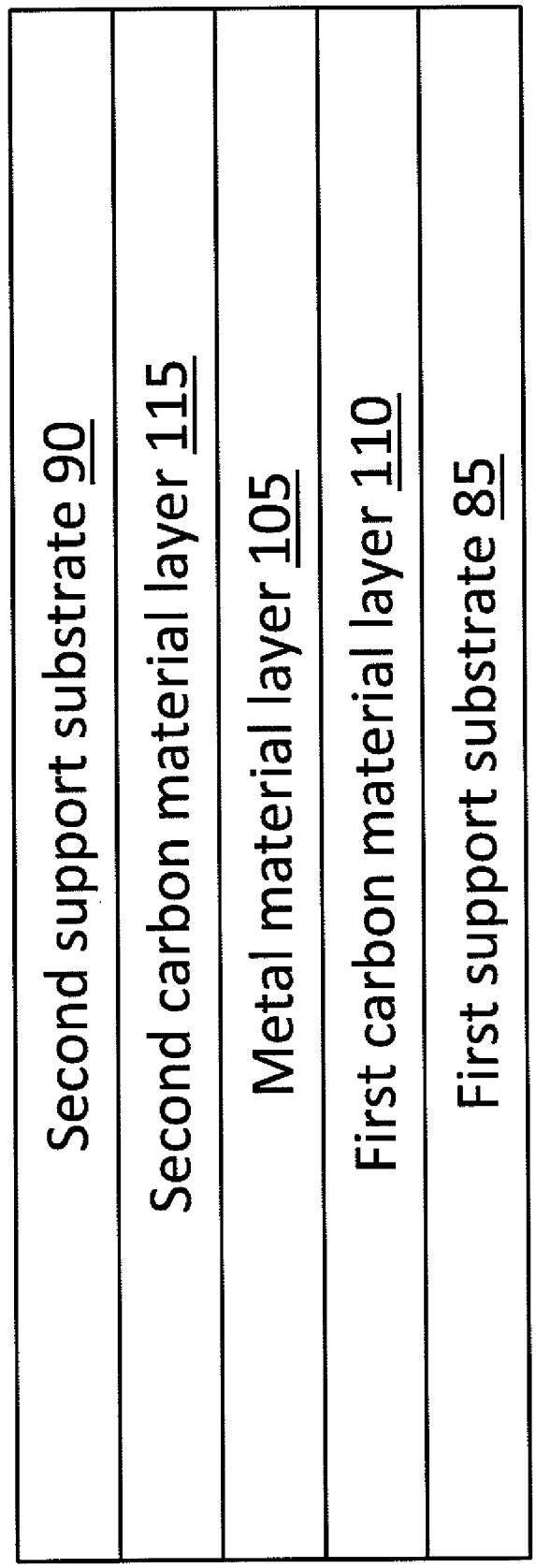
FIG. 4d shows an optical information medium having a first support substrate, a first carbon material layer, a metal material layer, a second carbon material layer, and a second support substrate.

The metal material layer can be "sandwiched" between two carbon material layers. In this case, the metal material layer facially contacts both the first carbon material layer and the second carbon material layer. An example of this is shown in FIG. 4d. In this figure, a cross section would first intersect the first support substrate 85, then the first carbon material layer 110, then the metal material layer 105, then the second carbon material layer 115, then the second support substrate 90.

An alternative simplified "sandwich" configuration could comprise at least one support substrate 10, a first carbon material layer 110, a metal material layer 105, and a second carbon material layer 115. The support substrate can directly contact the first carbon material layer, or there can be at least one intervening layer between the support substrate and the first carbon material layer. The first carbon material layer can facially contact the metal material layer, and the metal material layer can facially contact the second carbon material layer. A cross section would first intersect the support substrate, then the first carbon material layer, then the metal material layer, then the second carbon material layer Methods of Preparation—Carbon Layer and Metal Data Layer Additional embodiments of the invention are directed towards methods of preparing an optical information medium.

The various layers can be applied in various orders, depending on the particular layering desired in the optical information medium product. The layers can all be applied on one side of the support substrate, resulting in a final product having the support substrate on one outer face. Alternatively, the layers can be applied onto both sides of the support substrate, resulting in a final product having the support substrate located such that it is not an outer face of the final product.

In one embodiment, the method can comprise providing a support substrate, applying a metal material layer such that the metal material layer facially contacts the support substrate, and applying a carbon material layer such that the carbon material layer facially contacts the metal material layer.

In an alternative embodiment, the method can comprise providing a support substrate, applying at least one intervening layer such that the intervening layer facially contacts the support substrate, applying a metal material layer such that the metal material layer facially contacts the intervening layer, and applying a carbon material layer such that the carbon material layer facially contacts the metal material layer.

In yet another alternative embodiment, the method can comprise providing a first support substrate; applying a first carbon material layer, such that the first carbon material layer facially contacts the first support substrate; applying a metal material layer, such that the metal material layer facially contacts the first carbon material layer; applying a second carbon material layer, such that the second carbon material layer facially contacts the metal material layer; and applying a second support substrate, such that the second support substrate facially contacts the second carbon material layer.

The applying step can comprise physical vapor deposition (such as sputtering, reactive sputtering, e-beam evaporation, and laser ablation of a target), or chemical vapor deposition. Sputtering can be performed using laboratory-scale instruments that typically have a single chamber and one or more targets (such as a PVD 75 instrument from the Kurt J. Lesker Company (Pittsburgh, Pa.)), or can be performed using industrial-scale instruments that have multiple chambers and multiple targets (such as a Sprinter instrument from Oerlikon Systems (Pfäffikon, Switzerland).

Materials—Tellurium Data Layer Containing Infused Gas

One embodiment of the present invention comprises an optical information medium suitable for archival purposes. The materials and manufacturing processes are designed to be very durable and not subject to age-degradation effects to a substantial degree. Likewise, the information writing process is intended to be permanent and not subject to age degradation effects to a substantial degree. The optical information medium comprises at least one tellurium and carbon oxide (carbon monoxide, carbon dioxide, or both carbon monoxide and carbon dioxide) data layer 120, and at least one support substrate 10.

The tellurium and carbon dioxide data layer comprises, consists essentially of, or consists of a tellurium material and a carbon oxide ($CO_x$ where x=1 or 2; carbon monoxide, carbon dioxide, or both carbon monoxide and carbon dioxide). The carbon dioxide or carbon monoxide can be contained in the data layer in any manner. For example, the carbon dioxide or carbon monoxide can be covalently bonded, entrapped, or adsorbed into or onto the tellurium material in the data layer. The carbon dioxide or carbon monoxide can be present in the data layer at generally any concentration.

The tellurium material can be tellurium metal (Te) or at least one tellurium alloy. Tellurium can be alloyed with a variety of other elements such as selenium (Se), antimony (Sb), indium (In), lead (Pb), tin (Sn), bismuth (Bi), germanium (Ge), arsenic (As), oxygen (O), cadmium (Cd), or combinations thereof. Tellurium alloys may be more stable against oxidation than is tellurium metal.

Examples of tellurium alloys include $Te_xSe_{100-x}$, $Te_xSe_{100-x}$, (where X is less than or equal to 95), $Te_{86}Se_{14}$, $Te_{79}Se_{21}$, $Te_xSb_{100-x}$, $Te_xSb_{100-x}$ (where X is less than or equal to 95), $Te_xSe_ySb_z$, $Te_xSe_ySb_z$ (where X+Y+Z=100), $Te_x$-$Se_ySb_z$ (where X+Y+Z=100, Y is 10-30, and Z is 5-20), $Te_{75}Se_{20}Sb_5$, $Te_{72.5}Se_{20}Sb_{7.5}$, $Te_3Sb_2$, $Te_xSe_yIn_z$ (where X+Y+Z=100), $Te_xSe_yIn_z$ (where X+Y+Z=100, Y is 10-30, and Z is 5-20), $InTe_3$, $Te_{75}Se_{20}In_5$, $Te_{72.5}Se_{20}In_{7.5}$, $Te_x$-$Se_yPb_z$, $Te_xSe_yPb_z$ (where X+Y+Z=100), $Te_xSe_yPb_z$ (where X+Y+Z=100, Y is 10-30, and Z is 5-20), $Te_{75}Se_{20}Pb_5$, $Te_{72.5}Se_{20}Pb_{7.5}$, TePb, $Te_xSe_ySn_z$, $Te_xSe_ySn_z$ (where X+Y+Z=100), $Te_xSe_ySn_z$ (where X+Y+Z=100, Y is 10-30, and Z is 5-20), $Te_{75}Se_{20}Sn_5$, $Te_{72.5}Se_{20}Sn_{7.5}$, $Te_3Bi_2$, $Te_xBi_2$, $Te_xSe_y$-$Bi_z$ (where X+Y+Z=100), TeSn, $Te_xSe_yBi_z$ (where X+Y+Z=100, Y is 10-30, and Z is 5-20), $Te_{75}Se_{20}Bi_5$, $Te_{72.5}Se_{20}Bi_{7.5}$, TeGeAs, TeGeSbS, $TeO_xGe$, $TeO_xSn$, Pb—Te—Se, Pb—Te—Sb, As—Te, $As_{10}Te_{90}$, $As_{32}Te_{68}$, Ge—Te, $Ge_{10}Te_{90}$, CdTe, and PbTe. Examples of other alloys include GeTe, $Ge_{10}Te_{90}$, $As_2Te_3$, SnTe, $Sb_2Te_3$, PbTe, $Bi_2Te_3$, $As_{10}Te_{90}$, $As_{32}Te_{68}$, and $InTe_3$.

The tellurium and carbon dioxide or carbon monoxide data layer can generally be any thickness. An example lower thickness limit can be about 2 nm. An example upper thickness limit can be about 250 nm. Example thicknesses are about 2 nm, about 4 nm, about 6 nm, about 8 nm, about 10 nm, about 12 nm, about 14 nm, about 16 nm, about 18 nm, about 20 nm, about 30 nm, about 40 nm, about 50 nm, about 60 nm, about 70 nm, about 80 nm, about 90 nm, about 100 nm, about 110 nm, about 120 nm, about 130 nm, about 140 nm, about 150 nm, about 160 nm, about 170 nm, about 180 nm, about 190 nm, about 200 nm, about 210 nm, about 220 nm, about 230 nm, about 240 nm, about 250 nm, and ranges between any two of these values. A presently preferred range can be about 12 nm to about 45 nm.

The tellurium and carbon dioxide or carbon monoxide data layer can further comprise one or more additional materials such as silver.

The tellurium and carbon dioxide or carbon monoxide data layer can further comprise sites to which data has been written. The sites exhibit a detectable difference from other sites to which data has not been written.

Figure 5C:
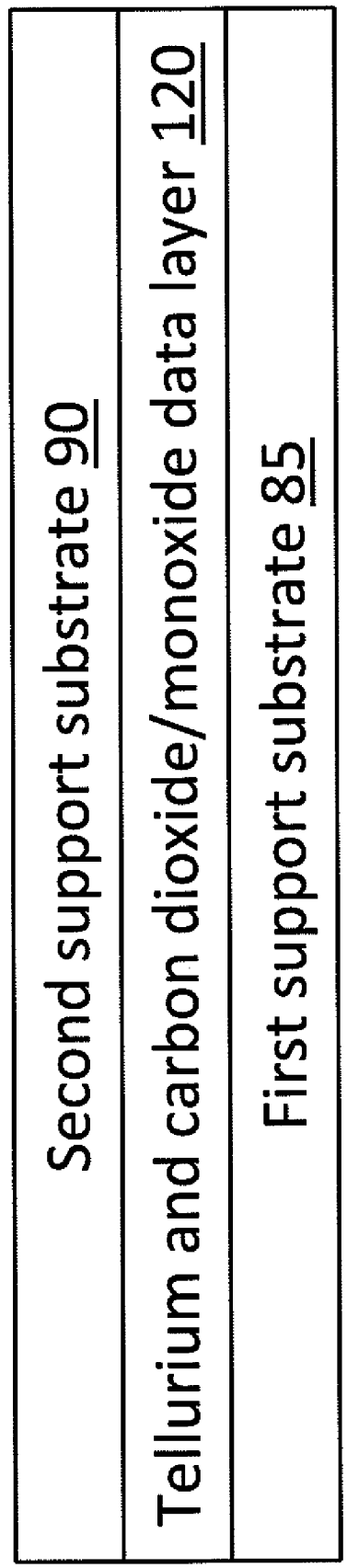
FIG. 5c shows an optical information medium having a first substrate layer, a tellurium/carbon dioxide/monoxide data layer, and a second substrate layer.

The optical information medium can comprise a first support substrate 85 and a second support substrate 90. The first support substrate and second support substrate can be made of the same material, or can be made of different materials. The first support substrate and the second support substrate typically are oriented such that they form the outer two layers of the optical information medium (i.e. are the first and last layers when viewed as a cross section). This is especially true in a DVD-type format. This arrangement is shown in FIG. 5c.

The support substrate can facially contact the tellurium and carbon dioxide or carbon monoxide data layer, or there can be at least one intervening layer between them. These arrangements of layers are graphically shown in FIGS. 5a and 5b. In the embodiment shown in FIG. 5a, a cross section would first intersect the support substrate, then the data layer. In the embodiment shown in FIG. 5b, a cross section would first intersect the support substrate, then the at least one intervening layer, then the data layer. In FIG. 5b, the support substrate facially contacts the at least one intervening layer, and the at least one intervening layer facially contacts the data layer.

An example of an intervening layer is a thermal barrier layer. A thermal barrier can protect the substrate from heat generated during writing data to the data layer. Examples of thermal barrier layers include silica ($SiO_2$), carbon, alumina, silicon, silicon nitride, boron nitride, titanium oxides ($TiO_x$), and tantalum oxides ($TaO_x$).

An additional example of an intervening layer is a heat conduction layer. This type of layer conducts heat away from the sites to which data has been written, reducing or eliminating thermal damage to adjacent sites.

The optical information medium can further comprise at least one reflective layer. Reflective layers are typically oriented away from the support substrate, such that the distance from the reflective layer to the data layer is less than the distance from the reflective layer to the support substrate.

The optical information medium displays a greater resistance to oxidation than a similar medium prepared without the carbon dioxide or carbon monoxide in the data layer.

Methods of Preparation—Tellurium Data Layer Containing Infused Gas

Additional embodiments of the invention are directed towards methods of preparing an optical information medium.

The various layers can be applied in various orders, depending on the particular layering desired in the optical information medium product. The layers can all be applied on one side of the support substrate, resulting in a final product having the support substrate on one outer face. Alternatively, the layers can be applied onto both sides of the support substrate, resulting in a final product having the support substrate located such that it is not an outer face of the final product.

In one embodiment, the method can comprise providing a support substrate, and applying a tellurium and carbon dioxide and/or carbon monoxide data layer such that the data layer facially contacts the support substrate. This method produces an optical information medium such as the one shown in FIG. 5a.

In an alternative embodiment, the method can comprise providing a support substrate, applying at least one intervening layer such that the intervening layer facially contacts the support substrate, and applying a tellurium and carbon dioxide and/or carbon monoxide data layer such that the data layer facially contacts the intervening layer. This method produces an optical information medium such as the one shown in FIG. 5b.

In yet another alternative embodiment, the method can comprise providing a first support substrate; applying a tellurium and carbon dioxide and/or carbon monoxide data layer, such that the data layer facially contacts the first support substrate; and applying a second support substrate, such that the second support substrate facially contacts the data layer. This method produces an optical information medium such as the one shown in FIG. 5c.

The applying step can comprise physical vapor deposition (such as sputtering, reactive sputtering, e-beam evaporation, and laser ablation of a target), or chemical vapor deposition. Sputtering can be performed using laboratory-scale instruments that typically have a single chamber and one or more targets (such as a PVD 75 instrument from the Kurt J. Lesker Company (Pittsburgh, Pa.)), or can be performed using industrial-scale instruments that have multiple chambers and multiple targets (such as a Sprinter instrument from Oerlikon Systems (Pfäffikon, Switzerland).

Tellurium metal or a tellurium alloy can be applied in the presence of carbon dioxide, carbon monoxide, or both carbon dioxide and carbon monoxide. The concentration of carbon dioxide or carbon monoxide present can generally be any concentration. Examples of the concentration of carbon dioxide present during the applying step can be about 1% (v/v), about 2% (v/v), about 2.5% (v/v), about 3% (v/v), about 4% (v/v), about 5% (v/v), about 6% (v/v), about 7% (v/v), about 8% (v/v), about 9% (v/v), about 10% (v/v), about 15% (v/v), about 20% (v/v), about 25% (v/v), about 30% (v/v), about 35% (v/v), about 40% (v/v), about 45% (v/v), about 50% (v/v), or ranges between any two of these values. If both carbon dioxide and carbon monoxide are used, each can be present at the same concentration or at different concentrations. At least one inert gas such as a noble gas, helium, neon, krypton, or argon would typically be used for the balance of 100%. Argon is presently preferred due to its low cost.

Methods of Use

Any of the above described digital data mediums can be used to store digital data. Methods can comprise providing a digital data medium, and applying energy to sites in the metal material layer to cause a detectable change in the data layer of the medium. The method can further comprise detecting the change in the data layer.

Applying energy to sites in the data layer can also locally generate sufficient heat to deform tracks in the support substrate. Deformed sites in the support substrate can be subsequently detected.

Lasers can be used in the applying energy step and in the detecting step. Main classes of lasers include gas, diode-pumped solid state, and diode lasers.

The following examples are included to demonstrate preferred embodiments of the invention. It should be appreciated by those of skill in the art that the techniques disclosed in the examples which follow represent techniques discovered by the inventor(s) to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

Example 1

Identification of Candidate Write-Layer Materials

Several tools and approaches can be taken to identify materials suitable for use as a write-layer in optical media. A first tool is the phase diagram of the candidate material. Phase diagrams describe thermodynamically stable materials, and provide information on melting points, phase separation into different compounds and structures, peak crystallization temperatures, and eutectic points.

Write-layer materials can be selected having melting points high enough such that the material is stable below some preselected temperature (such as 100 degrees C.), yet low enough that it can be melted by a laser while not deforming or decomposing the support substrate material in a product. The material preferably will not separate into two different states of matter upon heating (sometimes called "eutectic composition"). The material will preferably not separate into two different phases upon either heating or cooling.

While materials may not satisfy all of the "ideal" qualifications, they may still be suitable for use in commercial products. Information regarding the kinetics of any changes may also help identify, screen, or rank candidate materials. Phase change kinetics information can be obtained using methods such as differential scanning calorimetry and X-ray crystallography. Kinetics information can describe how quickly or slowly a material will approach a favorable or unfavorable state shown in a phase diagram for a given temperature. For example, an alloy that has a peak crystallization temperature within about 50 degrees C. of room temperature would be less attractive for commercial use than an alloy having a higher peak crystallization temperature.

Example 2

General Method Used for Reactive Sputtering

RF sputtering was performed using a PVD 75 instrument (Kurt J. Lesker Company; Pittsburgh, Pa.). The system was configured with one RF power supply, three magnetron guns that can hold 3 inch (7.62 cm) targets, and facilities for two sputter gases. The targets were arranged in a sputter-up configuration. Shutters cover each of the three targets. Substrates were mounted on a rotating platen that can be heated up to 200° C. The rotating platen was positioned above the targets. Most of the experimentation was done with no active heating of the platen. With no active heating, the temperature of the platen gradually increases with increased sputtering time at 400 w until the temperature reaches a maximum about 60° C.-70° C. The maximum temperature is reached after about three hours. The initial temperature in the chamber prior to sputtering was typically about 27° C. Times, targets, and sputtering sources were varied as described in the following examples.

Substrates used were typically a silicon (Si) wafer or a glass microscope slide having a UV cutoff at about 300 nm.

Plasma cleaned substrates were mounted onto the platen. A portion of the silicon substrate was masked with a piece of tape having an acrylic adhesive in order to facilitate measurement of sputtering deposition rates. With the platen in place, a vacuum was applied to the sputtering chamber until the pressure is lower than $2.3 \times 10^{-5}$ torr. Then, argon (Ar) and carbon dioxide ($CO_2$) in specified proportions are introduced into the chamber such that the pressure in the chamber is about 12 mtorr. The Capman pressure was maintained at 13 mtorr (the Capman pressure is an instrumental setting of the PVD 75 instrument). The plasma is then lit above the carbon graphite target (99.999%; Kurt J. Lesker Company, part number EJTCXXX503A4). The power is slowly ramped up to 400 w RF and the chamber pressure is reduced to about 2.3 mtorr (Capman pressure equals 3 mtorr), all the while maintaining the specified ratio of Ar to $CO_2$. Next, the shutter over the graphite target is opened and the substrate is exposed to the sputtering target for a predetermined length of time. At the end of that time, the shutter over the target closes and the power is ramped down. The substrate containing sputtered material is then removed from the instrument for analysis or further processing.

Example 3

General Method for AFM Thickness Measurement

Atomic force microscopy (AFM) was performed using a Veeco Dimension 3100 instrument (Veeco; Plainview, N.Y.) with the image taken in tapping mode.

The coated silicon wafer was prepared for step height measurement by AFM as follows. The tape masking a portion of the surface was removed. The surface was wet with acetone and wiped with an acetone-soaked cotton-tipped swab to remove residual adhesive and loose material at the interface between the exposed and masked portions of the wafer. The interface step height on the Si wafer was measured by AFM. A few of the films on the Si wafer were studied by XPS. The coated glass microscope slides were analyzed by UV-VIS spectroscopy.

Example 4

General Method for UV-VIS Measurement

UV/VIS spectroscopy of films on glass slides was performed using an Agilent 8453 UV/VIS spectrometer (Agilent; Santa Clara, Calif.). For a spectroscopy measurement, the glass slide was oriented such that the beam of light from the spectrometer passes first through the air-glass interface of the slide and then through the glass-film interface. Every scan was accompanied by a scan of plain uncoated glass slide. The absorbance spectrum of the thin film was obtained by subtracting the absorbance spectrum of the plain glass slide from the absorbance spectrum of the coated glass slide. We make the assumption that the reflectivity of the glass-air interface of the plain glass slide is the same as the reflectivity of the film-air interface on the coated glass slide, and that the reflectivity of the film-glass interface is negligible. When making a scan of a coated glass slide, the slide was positioned in such a way that the light beam of the spectrometer passes though the section of the glass slide that was 2.2 cm from the center of the platen during the sputtering deposition.

Example 5

General Method for Measurement of Optical Density

Optical density of a thin film was determined by dividing the UV/VIS absorbance by the film thickness. The higher the optical density of a material is at a given wavelength, the less transparent it is at that wavelength. Two samples and two measurements are used to determine optical density. The two samples are a coated, masked silicon wafer and a coated glass slide. The films on these two samples ideally are prepared simultaneously. A UV/VIS absorbance spectrum is obtained of the coated glass slide. An AFM image of the interface of the masked and exposed section of the Si wafer is obtained and a step height measurement is made to obtain the thickness of the film. Then, the absorbance values along all points of the absorbance spectrum are divided by film thickness to obtain the optical density spectrum for the film.

Example 6

Preparation of Disc Lacking Oxygenated-Gas Infused Data Layer

A polycarbonate optical disk with no coatings on it was mounted on the platen in the PVD 75 instrument with the optical tracks on the disk facing the targets. A carbon graphite target was sputtered for one hour with argon as the sputter gas at a Capman pressure 3 mtorr with the magnetron power at 400 w RF. This created a carbon film on the surface of the optical disk that was about 31 nm thick. Next a layer of chromium was deposited.

Example 7

Preparation of Disc Containing Carbon Dioxide Infused Data Layer

A polycarbonate optical disk with no coatings on it was mounted on the platen in the PVD 75 instrument with the optical tracks on the disk facing the targets. A carbon graphite target is sputtered for 1 hour with Ar and $CO_2$ as the sputter gas with the concentration of the $CO_2$ at a Capman pressure of 3 mtorr with the magnetron power at 400 w RF. Next, a layer of metal such as aluminum or chromium was deposited on top of the carbon film.

Example 8

Application of Chromium Reflective Layer

Chromium layers were applied to optical disk by sputter deposition, usually after the deposition of a carbon layer. Typically the chamber is kept under vacuum between the application carbon layer and the chromium layer. A chromium target was sputtered for 15 minutes with Ar as the sputter gas at a Capman pressure 4 mtorr with the magnetron power at 400 w RF. This created a chromium film on the surface of the optical disk that is about 138 nm thick.

Example 9

Measurement of Film Growth Rate by Varying Sputtering Time

AFM was used to determine the thickness of the films. As discussed, earlier, a film was masked with tape during sputtering. After sputtering, the tape was removed and the surface was cleaned. The step height was then measured by AFM. Chromium sputtered under the conditions of 400 w RF magnetron power and a Capman pressure of 4 mtorr was found to grow at a rate of 0.154 nm/s. This was determined from the slope of a calibration curve of 5 data points. Aluminum sputtered under the conditions of 400 w RF magnetron power and a Capman pressure of 3 mtorr was found to grow at a rate of 0.141 nm/s. This was determined from the slope of a calibration curve of 3 data points.

Example 10

Measurement of Film Growth Rate by Varying Gas Concentration

The growth rate of carbon films was found to be dependent on the percentage of carbon dioxide in the sputter gas. The experimental conditions that are constant for all experiments are 400 w RF magnetron power and Capman=3 mtorr. The amount of carbon dioxide in the process gas as a percentage of the amount of argon that has been experimented with was 0% (v/v), 1% (v/v), 2% (v/v), and 4% (v/v). The growth rates of these films are shown in the following table, and were determined by dividing the thicknesses of the films, as determined by AFM, by the sputter time.

| Percentage carbon dioxide | Thickness growth rate |
| --- | --- |
| 0% | $8.65 \times 10^{-3}$ nm/s |
| 1% | $8.72 \times 10^{-3}$ nm/s |
| 2% | $6.03 \times 10^{-3}$ nm/s |
| 4% | $2.00 \times 10^{-3}$ nm/s |

These growth rates clearly show that increasing carbon dioxide concentrations slows the sputtering deposition rate.

Example 11

Measurement of Film Optical Density (Transparency) by Varying Gas Concentration

The optical density of the carbon films was found to decrease with increasing carbon dioxide sputtering concentrations over the range 1% -4% (v/v) in the sputter gas. For this Example, films were created by sputtering carbon graphite for 4 hours at 400 w RF magnetron power and with a Capman pressure of 3 mtorr. The 650 nm optical densities of these films are shown in the following table.

| Percentage carbon dioxide | Optical density |
| --- | --- |
| 1% | $3.8 \times 10^{-3}$ nm$^{-1}$ |
| 2% | $2.5 \times 10^{-3}$ nm$^{-1}$ |
| 4% | $1.5 \times 10^{-3}$ nm$^{-1}$ |

Figure 6:
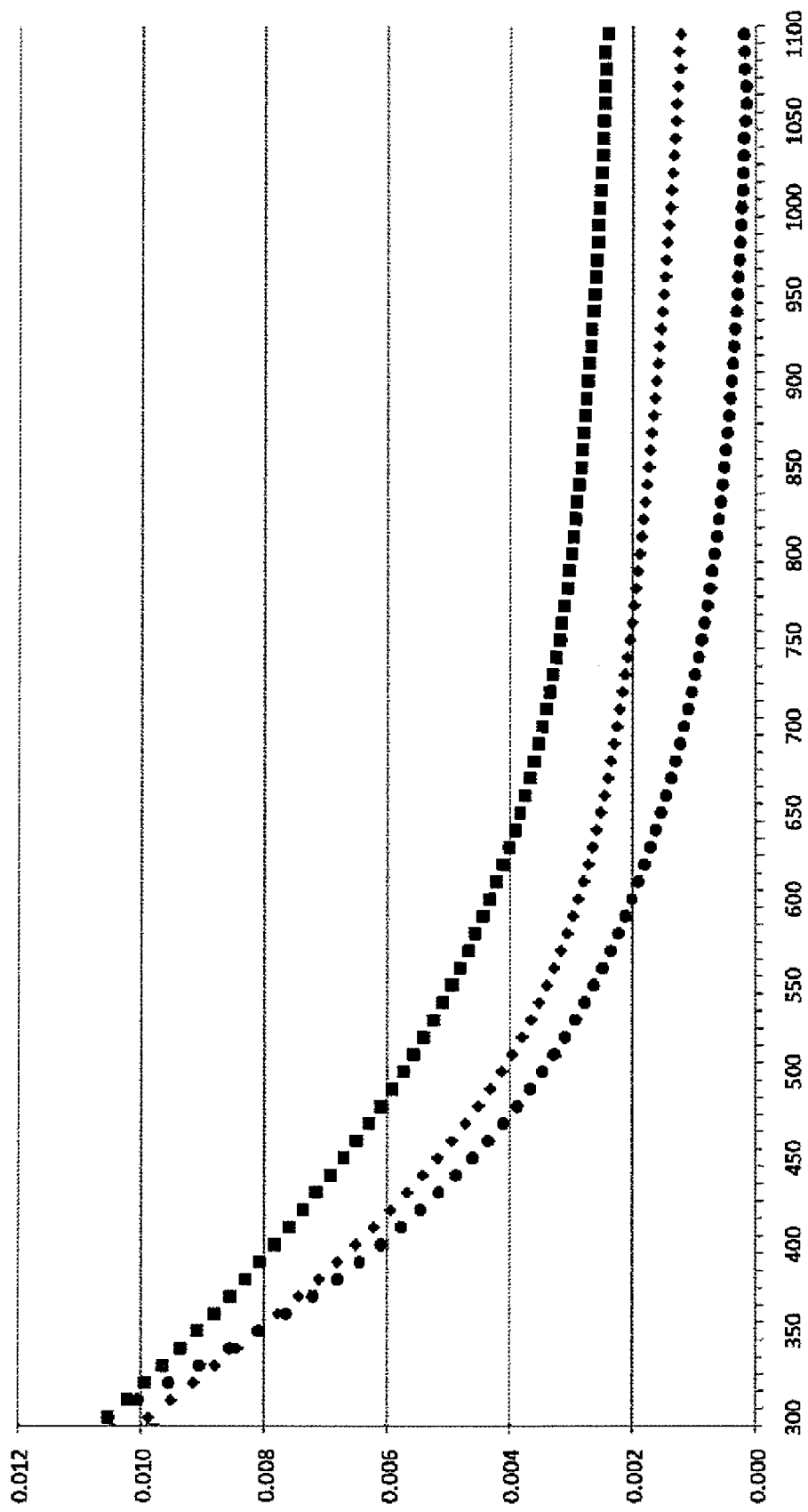
FIG. 6 shows the decrease in optical density (or increase in optical transparency) of carbon films prepared with increasing concentrations of the oxygenated gas carbon dioxide. The x-axis is wavelengths in nm. The y-axis is absorbance per thickness (1/nm). The line indicated with square symbols represents 1% (v/v) carbon dioxide. The line indicated with diamond symbols represents 2% (v/v) carbon dioxide. The line indicated with round symbols represents 4% (v/v) carbon dioxide.

Optical densities across a spectrum from 300 nm to 1100 nm were measured, and are shown in FIG. 6. These results clearly show that increasing carbon dioxide concentrations decreased the optical density of the formed film. Stated differently, increasing carbon dioxide concentrations increased the transparency of the formed film.

Example 12

X-Ray Photoelectron Spectroscopy of Carbon Films Infused with Carbon Dioxide

X-ray photoelectron spectroscopy (XPS) was performed with an SSX-100 instrument (Surface Science maintained by Surface Physics; Bend, Oreg.). XPS provides elemental compositions of the upper approximately 10 nm of materials. XPS showed a steady increase in the oxygen content of the films as the percentage of carbon dioxide in the sputter gas increased. The results are shown in the following table.

| Percentage carbon dioxide | Percentage oxygen in film by XPS |
| --- | --- |
| 0% | 12.3% |
| 1% | 27.0% |
| 2% | 24.6% |
| 4% | 39.8% |

Additionally, a shoulder on the high energy side of the C1s narrow scan increased in size relative to the main C1s peak as the concentration of carbon dioxide in the sputter gas increased. This indicated that the amount of carbon covalently bound to oxygen increased as the percentage of carbon dioxide in the sputter gas increased.

Example 13

Measurement of Carbon Film Delamination

It is well known that carbon films deposited by sputtering can degrade due to internal stresses and decomposition in the atmosphere. There are distinct visible differences in appearance and properties between intact carbon films and severely degraded ones. A carbon film that has undergone severe degradation has a clouded appearance, is lighter in color and can easily be wiped away or washed off of the substrate. In contrast, an intact film is reflective and difficult to remove from the substrate.

The following experiments demonstrate that infusion of carbon dioxide into a graphite film improves the stability of the film. Various films were prepared on glass microscope slides for analysis. For films created by sputtering a graphite target at 400 w with a Capman pressure of 3 mtorr, the tendency of the films to visibly degrade increases as the sputter time increases. For example, a control film created by sputtering graphite without added carbon dioxide for 1 hour did not show signs of visible degradation, but a 1.5 hour film did show signs of visible degradation. Inclusion of carbon dioxide in the sputter gas increases the time that a film can be sputtered before creating an unstable film. For example, a film created by sputtering graphite for 3 hours with 1% (v/v) carbon dioxide included in the sputter gas was not observed to degrade, but a 4 hour film did show signs of degradation. A film created by sputtering graphite for 4 hours with 2% (v/v) carbon dioxide included in the sputter gas did not show signs of degradation. These results are shown in the following table.

| % carbon dioxide | Time | Visibly degraded? |
| --- | --- | --- |
| 0% | 1 hour | No |
| 0% | 1.5 hours | Yes |
| 1% | 3 hours | No |
| 1% | 4 hours | Yes |
| 2% | 4 hours | No |

Example 14

Measurement of Disc Durability

Simple tests to measure durability include immersion of the sample in boiling water for 48 hours, and a tape-pull adhesion test. A more complex degradation test is specified in ECMA-379 (also known as ISO-IEC-10995).

Example 15

Prophetic Example of Ablation Method

Optical information media can be produced containing a polycarbonate support substrate and a carbon data layer infused with carbon dioxide. The media can be exposed to a laser to ablate or deform sites on the media in order to encode a computer program or file into the media. The media can subsequently be read in a conventional CD or DVD disc drive to retrieve the computer program or file.

Example 16

Prophetic Example Comparing Ablation of Discs Made with and without Oxygenated Gas Optical information media produced with a polycarbonate support substrate, a carbon data layer, and with or without infused carbon dioxide in the data layer will be compared for their performance and longevity. It is expected that media including infused carbon dioxide will be superior in writing performance and in longevity testing.

Example 17

Materials and Methods

Polycarbonate blank discs are commercially available from a variety of sources such as Bayer MaterialScience AG (Leverkusen, Germany), General Electric Company (Fairfield, Conn.), and Teijin Limited (Osaka, Japan). Fused silica blank discs are commercially available from a variety of sources such as Corning Incorporated (Corning, N.Y.), Hoya Corporation (Tokyo, Japan), and Schott AG (Mainz, Germany).

Tellurium was 99.999% pure (Sigma Aldrich; St. Louis, Mo.; catalog 452378, lot 01948ER). Tellurium deposition was carried out with an electron beam deposition system (model NRC 3116; NRC Equipment Corp. (now Varian, Palo Alto, Calif.)). The system was equipped with a crystal sensor for measurement of the thicknesses of the deposited films. Carbon was obtained from a carbon graphite target (99.999%; Kurt J. Lesker Company, part number EJTCXXX503A4).

RF sputtering was performed using a PVD 75 instrument (Kurt J. Lesker Company; Pittsburgh, Pa.). The system was configured with one RF power supply, three magnetron guns that can hold 3 inch (7.62 cm) targets, and facilities for two sputter gases. The targets were arranged in a sputter-up configuration. Shutters cover each of the three targets. Substrates were mounted on a rotating platen that can be heated up to 200° C. The rotating platen was positioned above the targets. Most of the experimentation was done with no active heating of the platen. With no active heating, the temperature of the platen gradually increases with increased sputtering time at 400 w until the temperature reaches a maximum about 60° C.-70° C. The maximum temperature is reached after about three hours. The initial temperature in the chamber prior to sputtering was typically about 27° C. Times, targets, and sputtering sources were varied as described in the following examples.

Example 18

Preparation of Disc 95

A polycarbonate optical disc with no coatings on it, 120 mm in diameter and 0.6 mm thick was mounted on the platen in the PVD 75 instrument. For the first layer on the disk, a carbon graphite target was sputtered for 30 minutes with 98% (v/v) Ar and 2% (v/v) $CO_2$ as the sputter gas with the total Capman pressure maintained at 3 mtorr and the magnetron power set at 400 W RF. The resulting carbon film was about 14 nm thick.

For the second layer on the disk, 40 nm tellurium was deposited with the electron beam deposition system. The base pressure was $5 \times 10^{-5}$ torr.

For the third and final layer on the disk, a carbon graphite target was sputtered with 98% (v/v) Ar and 2% (v/v) $CO_2$ as the sputter gas with the total Capman pressure maintained at 3 mtorr. The plasma above the graphite target was lit at 65 W and the power to the gun was ramped up to 200 W at a rate of 3 W/s. When the power set point was reached a 1 hour countdown was started. At the end of the 1-hour countdown, a 15 minute countdown was started and power to the gun was ramped up to 400 W at a rate of 3 W/s. The shutter was closed at the end of the 15-minute countdown. The resulting carbon film was about 9 nm thick.

The resulting disc had a polycarbonate support substrate, a carbon and carbon dioxide reactive material layer, a tellurium layer, and a second carbon and carbon dioxide reactive material layer.

Example 19

Preparation of Disc 98

A polycarbonate optical disc with no coatings on it, 120 mm in diameter and 0.6 mm thick was mounted on the platen in the PVD 75 instrument. For the first layer on the disk, a carbon graphite target was sputtered for 15 minutes with 98% (v/v) Ar and 2% (v/v) $CO_2$ as the sputter gas with the total Capman pressure maintained at 3 mtorr and the magnetron power set at 400 W RF. The resulting carbon film was about 7 nm thick.

For the second layer on the disk, 40 nm tellurium was deposited with the electron beam deposition system. The base pressure was $5 \times 10^{-5}$ torr.

For the third and final layer on the disk, a carbon graphite target was sputtered with 98% (v/v) Ar and 2% (v/v) $CO_2$ as the sputter gas with the total Capman pressure maintained at 3 mtorr. The plasma above the graphite target was lit at 65 W and the power to the gun was ramped up to 200 W at a rate of 3 W/s. When the power set point was reached a 1 hour countdown was started. At the end of the 1-hour countdown, a 15 minute countdown was started and power to the gun was ramped up to 400 W at a rate of 3 W/s. The shutter was closed at the end of the 15-minute countdown. The resulting carbon film was about 9 nm thick.

The resulting disc had a polycarbonate support substrate, a carbon and carbon dioxide reactive material layer, a tellurium layer, and a second carbon and carbon dioxide reactive material layer.

Example 20

Preparation of Disc 99

A polycarbonate optical disc with no coatings on it, 120 mm in diameter and 0.6 mm thick having a groove depth of 170 nm was mounted on the platen in the PVD 75 instrument. For the first layer on the disk, a carbon graphite target was sputtered for 15 minutes with 98% (v/v) Ar and 2% (v/v) $CO_2$ as the sputter gas with the total Capman pressure maintained at 3 mtorr and the magnetron power set at 400 W RF. The resulting carbon film was about 7 nm thick.

For the second layer on the disk, 50 nm tellurium was deposited with the electron beam deposition system. The base pressure was $6 \times 10^{-5}$ torr.

For the third and final layer on the disk, a carbon graphite target was sputtered for 30 minutes with 98% (v/v) Ar and 2% (v/v) $CO_2$ as the sputter gas with the total Capman pressure maintained at 3 mtorr and the magnetron power set at 200 W RF. The resulting carbon film was about 1 nm thick.

The resulting disc had a polycarbonate support substrate, a carbon and carbon dioxide reactive material layer, a tellurium layer, and a second carbon and carbon dioxide reactive material layer.

Example 21

Preparation of Disc 100

A polycarbonate optical disc with no coatings on it, 120 mm in diameter and 0.6 mm thick having a groove depth of 170 nm was mounted on the platen in the PVD 75 instrument. For the first layer on the disk, a carbon graphite target was sputtered for 30 minutes with 98% (v/v) Ar and 2% (v/v) $CO_2$ as the sputter gas with the total Capman pressure maintained at 3 mtorr and the magnetron power set at 400 W RF. The resulting carbon film was about 14 nm thick.

For the second layer on the disk, 61 nm tellurium was deposited with the electron beam deposition system. The base pressure was $3 \times 10^{-5}$ torr.

For the third and final layer on the disk, a carbon graphite target was sputtered for 30 minutes with 98% (v/v) Ar and 2% (v/v) $CO_2$ as the sputter gas with the total Capman pressure maintained at 3 mtorr and the magnetron power set at 200 W RF. The resulting carbon film was about 1 nm thick.

The resulting disc had a polycarbonate support substrate, a carbon and carbon dioxide reactive material layer, a tellurium layer, and a second carbon and carbon dioxide reactive material layer.

Example 22

Preparation of Disc 101

A polycarbonate optical disc with no coatings on it, 120 mm in diameter and 0.6 mm thick having a groove depth of 170 nm was mounted on the platen in the PVD 75 instrument. For the first layer on the disk, a carbon graphite target was sputtered for 30 minutes with 98% (v/v) Ar and 2% (v/v) $CO_2$ as the sputter gas with the total Capman pressure maintained at 3 mtorr and the magnetron power set at 400 W RF. The resulting carbon film was about 14 nm thick.

For the second layer on the disk, 70 nm tellurium was deposited with the electron beam deposition system. The base pressure was $2 \times 10^{-5}$ torr.

For the third and final layer on the disk, a carbon graphite target was sputtered for 30 minutes with 98% (v/v) Ar and 2% (v/v) $CO_2$ as the sputter gas with the total Capman pressure maintained at 3 mtorr and the magnetron power set at 200 W RF. The resulting carbon film was about 1 nm thick.

The resulting disc had a polycarbonate support substrate, a carbon and carbon dioxide reactive material layer, a tellurium layer, and a carbon and carbon dioxide reactive material layer.

Example 23

Preparation of Disc 123

A polycarbonate optical disc with no coatings on it, 120 mm in diameter and 0.6 mm thick having a groove depth of 60 nm was mounted on the platen in the PVD 75 instrument. For the first layer on the disk, a carbon graphite target was sputtered for 30 minutes with 98% (v/v) Ar and 2% (v/v) $CO_2$ as the sputter gas with the total Capman pressure maintained at 3 mtorr and the magnetron power set at 400 W RF. The Capman pressure is an instrumental parameter. The Capman pressure value is close to the pressure in the plasma chamber. The resulting carbon film was about 14 nm thick.

For the second layer on the disk, 60 nm tellurium was deposited with the electron beam deposition system. The base pressure was $5 \times 10^{-5}$ torr.

For the third and final layer on the disk, a carbon graphite target was sputtered for 30 minutes with 98% (v/v) Ar and 2% (v/v) $CO_2$ as the sputter gas with the total Capman pressure maintained at 3 mtorr and the magnetron power set at 200 W RF. The resulting carbon film was about 1 nm thick.

The resulting disc had a polycarbonate support substrate, a carbon and carbon dioxide reactive material layer, a tellurium layer, and a second carbon and carbon dioxide reactive material layer.

Example 24

General Methods for Writing Data to Discs

Marks were made in the various discs using a Pulstec ODU1000 instrument (Pulstec Industrial Co., Ltd.; Hamamatsu-City; Japan) with a diode laser set at a wavelength of 650 nm. All writing was performed at 1× speed (3.49 m/second). All writing was performed on single tracks unless otherwise noted. An HF signal was seen in all cases, and marks were positively observed using a microscope.

Example 25

Writing Data to Disc 95

Writing to disc number 95 was performed at a variety of power levels: 4 mW, 5 mW, 6 mW, 8 mW, 10 mW, 11 mW, 12 mW, 13 mW, 15 mW, 16 mW, and 20 mW. Both castle and multipulse strategies were used at 33% duty. The following mark lengths were successfully written and verified by microscope: 3 T (398 nm), 5 T (663 nm), and 14 T (1857 nm).

Example 26

Writing Data to Disc 98

Writing to disc number 98 was performed at a variety of power levels: 3 mW, 4 mW, 5 mW, 6 mW, 7 mW, 8 mW, 9 mW, 10 mW, 12 mW, 14 mW, 15 mW, 16 mW, and 20 mW. A multipulse strategy was used at 33% duty. The following mark lengths were successfully written and verified by microscope: 3 T (398 nm), 4 T (530 nm), 5 T (663 nm), 7 T (928 nm), and 14 T (1857 nm).

Example 27

Writing Data to Disc 99

Writing to disc number 99 was performed at a variety of power levels: 3 mW, 3.5 mW, 4 mW, 4.5 mW, 5 mW, 6 mW, 7 mW, 8 mW, and 9 mW. A multipulse strategy was used at 33% duty. The following mark lengths were successfully written and verified by microscope: 3 T (398 nm), 4 T (530 nm), and 5 T (663 nm).

Example 28

Writing Data to Disc 100

Writing to disc number 100 was performed at a variety of power levels: 3.5 mW, 4 mW, 4.5 mW, 5 mW, 6 mW, and 7 mW. A multipulse strategy was used at 33% duty. The following mark lengths were successfully written and verified by microscope: 3 T (398 nm), 4 T (530 nm), 7 T (928 nm), and 14 T (1857 nm). A continuous write of several tracks with all mark lengths from 3 T (398 nm) to 14 T (1857 nm) at 4 mW was also performed and verified.

Example 29

Writing Data to Disc 101

Writing to disc number 101 was performed at a variety of power levels: 4 mW, 5 mW, 6 mW, 7 mW, and 8 mW. A multipulse strategy was used at 33% duty. The following mark lengths were successfully written and verified by microscope: 3 T (398 nm), 4 T (530 nm), and 14 T (1857 nm).

Example 30

Writing Data to Disc 123

Writing to disc number 123 was performed at a variety of power levels: 3.5 mW, 4 mW, 4.5 mW, and 8 mW. A multipulse strategy was used at 33% duty. A continuous write of 3 T (398 nm) marks for 50 tracks was successfully written and verified by microscope.

Example 31

Summary of Writing Data to Discs

The following table summarizes the various discs, and the results obtained.

| Disc number | Groove depth | First carbon layer | Te layer | Second carbon layer | Data written? |
|---|---|---|---|---|---|
| 95 | 170 | 14 | 40 | 9 | yes |
| 98 | 170 | 7 | 40 | 9 | yes |
| 99 | 170 | 7 | 50 | 1 | yes |
| 100 | 170 | 14 | 61 | 1 | yes |
| 101 | 170 | 14 | 70 | 1 | yes |
| 123 | 60 | 14 | 60 | 1 | yes |

Example 32

Materials and Methods

Polycarbonate blank discs are commercially available from a variety of sources such as Bayer MaterialScience AG (Leverkusen, Germany), General Electric Company (Fairfield, Conn.), and Teijin Limited (Osaka, Japan). Fused silica blank discs are commercially available from a variety of sources such as Corning Incorporated (Corning, N.Y.), Hoya Corporation (Tokyo, Japan), and Schott AG (Mainz, Germany).

A 0.125 inch (3.175 mm) tellurium target with a copper backing plate (Plasmaterials; Livermore, Calif.; lot number PLA5420787) was used for sputter deposition on tellurium.

RF sputtering was performed using a PVD 75 instrument (Kurt J. Lesker Company; Pittsburgh, Pa.). The system was configured with one RF power supply, three magnetron guns that can hold 3 inch (7.62 cm) targets, and facilities for two sputter gases. The targets were arranged in a sputter-up configuration. Shutters cover each of the three targets. Substrates were mounted on a rotating platen that can be heated up to 200° C. The rotating platen was positioned above the targets. All of the experimentation was done with no active heating of the platen. The distance between the target and the substrate was about 22 cm. The initial temperature in the chamber prior to sputtering was typically about 27° C. Times, targets, and sputtering sources were varied as described in the following examples.

Example 33

Preparation of Disc Series Containing Tellurium and Varying Carbon Dioxide Film

A series of Te films with or without carbon dioxide were deposited with the PVD 75 on a set of polycarbonate optical disks. The optical disks had no coatings on them, were 120 mm in diameter and were 0.6 mm thick. For the series of Te films deposited on the disks, the following parameters we kept constant: the tellurium target was sputtered, the power was 20 W DC, the Capman pressure was 7 mtorr, the substrate was rotated at 20 rpm, and the substrate was exposed to the sputtered target for 12 minutes. The concentration of carbon dioxide in the sputter gas was varied such that each film in the series was sputtered with a different concentration of carbon dioxide in the sputter gas in units of atom %. The concentrations of carbon dioxide were 0%, 1%, 2%, 2.3%, 2.5%, 2.7%, 3%, 4% and 10%. The balance of the sputter gas was argon.

Example 34

Evaluation of Effects of Carbon Dioxide in Te Data Layers

The discs from the previous Example were analyzed daily using an optical disc measurement system (Argus eco; dr. schwab Inspection Technology GmbH; Aichach, Germany). The absorbance of the films and the reflectivity were plotted over time.

Figure 7:
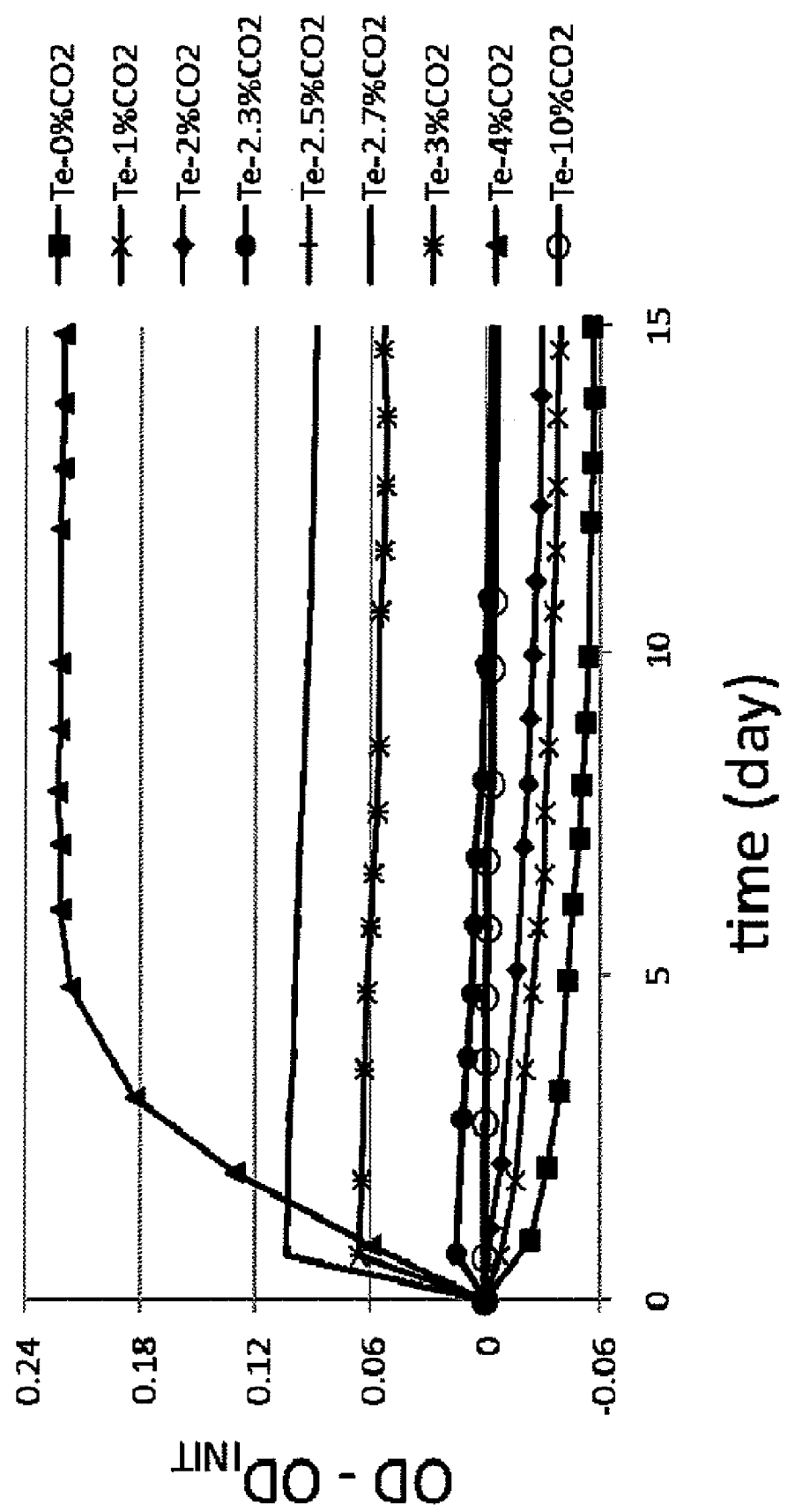
FIG. 7 shows a plot of optical density over time for tellurium films compared against tellurium and carbon dioxide films. The x-axis is time in days. The y-axis is the optical density (or absorbance), measured as the ratio $(OD-OD_{init})/OD_{init}$. The plot shows that addition of carbon dioxide to tellurium decreases changes due to oxidation. The square symbols represent tellurium without added carbon dioxide; the "x" symbols represent 1% added carbon dioxide; the "diamond" symbols represent 2% added carbon dioxide; the "filled circle" symbols represent 2.3% added carbon dioxide; the "+" symbols represent 2.5% added carbon dioxide; the "dash" symbols represent 2.7% added carbon dioxide; the "*" symbols represent 3% added carbon dioxide; the "triangle" symbols represent 4% added carbon dioxide; and the "open circle" symbols represent 10% added carbon dioxide.

The absorbance results are shown in FIG. 7. Each data point in FIG. 7 was obtained by subtracting the initial absorbance (optical density) obtained on the same day that the disc was made from the absorbance measurement, and was plotted against the number of days since the first measurement with the Argus instrument, which was carried out within a day of the disc's creation.

Figure 8:
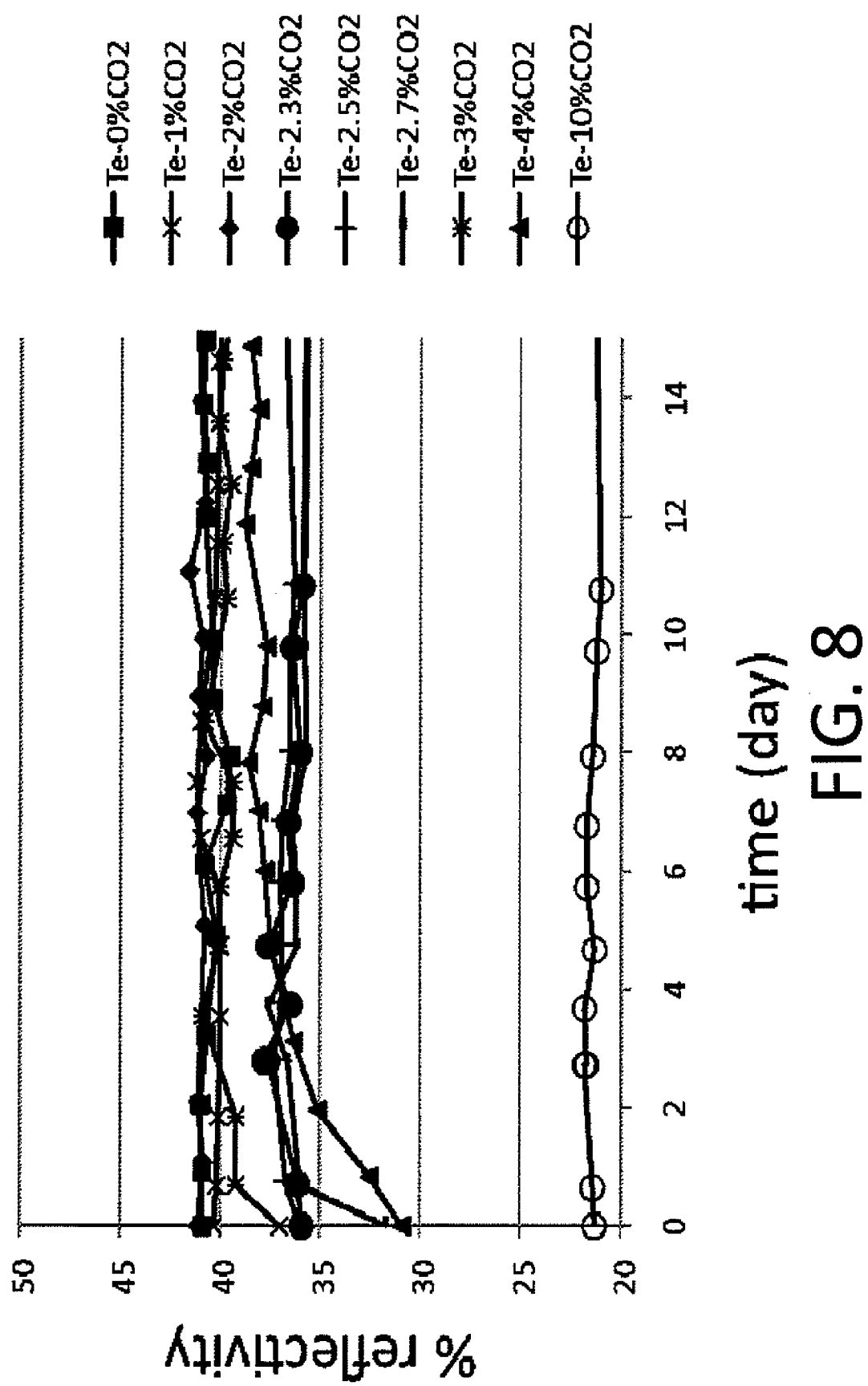
FIG. 8 shows a plot of reflectivity over time for tellurium films compared against tellurium and carbon dioxide films. The x-axis is time in days. The y-axis is percent reflectivity. The square symbols represent tellurium without added carbon dioxide; the "x" symbols represent 1% added carbon dioxide; the "diamond" symbols represent 2% added carbon dioxide; the "filled circle" symbols represent 2.3% added carbon dioxide; the "+" symbols represent 2.5% added carbon dioxide; the "dash" symbols represent 2.7% added carbon dioxide; the "*" symbols represent 3% added carbon dioxide; the "triangle" symbols represent 4% added carbon dioxide; and the "open circle" symbols represent 10% added carbon dioxide.

The reflectivity results are shown in FIG. 8, and tabulated below. The figure graphs the percent reflectivity of the discs against the number of days since preparation of the discs.

The raw data for FIGS. 7 and 8 are tabulated below. The numbers of days in the tables are not integers, as they are calculated based on the number of hours and minutes since creation of the disc.

Data obtained from the disc having 0% carbon dioxide.

| Absorbance | Reflectivity (%) | Time (days) | Change in absorbance |
|---|---|---|---|
| 1.2044 | 40.9 | 0 | 0 |
| 1.1805 | 40.9 | 0.922222222 | −0.0239 |
| 1.1719 | 41 | 2.051388889 | −0.0325 |
| 1.1652 | 40.7 | 3.209027778 | −0.0392 |
| 1.1615 | 40.2 | 4.906944444 | −0.0429 |
| 1.1585 | 40.8 | 6.098611111 | −0.0459 |
| 1.1552 | 39.7 | 7.105555556 | −0.0492 |
| 1.1538 | 39.5 | 7.921527778 | −0.0506 |
| 1.1518 | 40.4 | 8.875694444 | −0.0526 |
| 1.1504 | 40.4 | 9.889583333 | −0.054 |
| 1.1493 | 40.8 | 11.96527778 | −0.0551 |
| 1.1483 | 40.7 | 12.90486111 | −0.0561 |
| 1.1476 | 40.9 | 13.89861111 | −0.0568 |
| 1.1485 | 40.8 | 14.96180556 | −0.0559 |

Data obtained from the disc having 1% carbon dioxide.

| Absorbance | Reflectivity (%) | Time (days) | Change in absorbance |
|---|---|---|---|
| 1.1561 | 40.3 | 0 | 0 |
| 1.1481 | 40.2 | 0.679166667 | −0.008 |
| 1.1401 | 40.1 | 1.834722222 | −0.016 |
| 1.135 | 40 | 3.532638889 | −0.0211 |
| 1.1314 | 40 | 4.723611111 | −0.0247 |
| 1.1283 | 40.1 | 5.73125 | −0.0278 |
| 1.1253 | 41 | 6.547916667 | −0.0308 |
| 1.125 | 41.2 | 7.502083333 | −0.0311 |
| 1.123 | 41 | 8.515277778 | −0.0331 |
| 1.1207 | 40.3 | 10.59166667 | −0.0354 |
| 1.1192 | 40.2 | 11.53055556 | −0.0369 |
| 1.1189 | 40.2 | 12.52430556 | −0.0372 |
| 1.1187 | 40.1 | 13.58680556 | −0.0374 |
| 1.1174 | 40.1 | 14.61736111 | −0.0387 |
| 1.116 | 39.9 | 15.80347222 | −0.0401 |
| 1.1151 | 39.7 | 17.58402778 | −0.041 |
| 1.1145 | 40.3 | 18.62430556 | −0.0416 |
| 1.1122 | 39.6 | 24.56319444 | −0.0439 |

Data obtained from the disc having 2% carbon dioxide.

| Absorbance | Reflectivity (%) | Time (days) | Change in absorbance |
|---|---|---|---|
| 1.1544 | 41.1 | 0 | 0 |
| 1.1514 | 40.9 | 1.097916667 | −0.003 |
| 1.1458 | 41.1 | 2.102083333 | −0.0086 |
| 1.1378 | 40.8 | 5.070138889 | −0.0166 |
| 1.1341 | 41.2 | 6.974305556 | −0.0203 |
| 1.1321 | 40.7 | 7.940277778 | −0.0223 |
| 1.131 | 41.1 | 8.952083333 | −0.0234 |
| 1.1293 | 40.9 | 9.933333333 | −0.0251 |
| 1.1278 | 41.6 | 11.06319444 | −0.0266 |
| 1.1257 | 40.8 | 12.22222222 | −0.0287 |
| 1.1253 | 41 | 13.92083333 | −0.0291 |
| 1.1246 | 41.1 | 15.1125 | −0.0298 |
| 1.1221 | 41 | 16.11388889 | −0.0323 |
| 1.1212 | 41.8 | 16.93541667 | −0.0332 |
| 1.121 | 41.6 | 17.88819444 | −0.0334 |
| 1.1205 | 41.4 | 20.97916667 | −0.0339 |

Data obtained from the disc having 2.3% carbon dioxide.

| Absorbance | Reflectivity (%) | Time (days) | Change in absorbance |
|---|---|---|---|
| 0.9506 | 35.9 | 0 | 0 |
| 0.9655 | 36.1 | 0.715277778 | 0.0149 |
| 0.9628 | 37.6 | 2.785416667 | 0.0122 |
| 0.9622 | 37.8 | 2.7875 | 0.0116 |
| 0.9596 | 36.5 | 3.73125 | 0.009 |
| 0.9575 | 37.6 | 4.720138889 | 0.0069 |
| 0.9564 | 36.4 | 5.779861111 | 0.0058 |
| 0.9557 | 36.6 | 6.813194444 | 0.0051 |
| 0.9522 | 36 | 7.993055556 | 0.0016 |
| 0.9508 | 36.4 | 9.778472222 | 0.0002 |
| 0.9491 | 35.9 | 10.81319444 | −0.0015 |
| 0.946 | 35.7 | 16.75694444 | −0.0046 |

Data obtained from the disc having 2.5% carbon dioxide.

| Absorbance | Reflectivity (%) | Time (days) | Change in absorbance |
|---|---|---|---|
| 0.9548 | 36 | 0 | 0 |
| 0.9694 | 36.7 | 0.745833333 | 0.0146 |
| 0.9662 | 37.3 | 2.815972222 | 0.0114 |
| 0.9645 | 36.9 | 3.761805556 | 0.0097 |
| 0.9624 | 36.9 | 4.750694444 | 0.0076 |
| 0.9604 | 37 | 5.808333333 | 0.0056 |
| 0.9605 | 36.9 | 6.845138889 | 0.0057 |
| 0.9572 | 36.5 | 8.023611111 | 0.0024 |
| 0.955 | 36.5 | 9.809027778 | 0.0002 |
| 0.954 | 36.3 | 10.84444444 | −0.0008 |
| 0.9507 | 36.9 | 16.78680556 | −0.0041 |

Data obtained from the disc having 2.7% carbon dioxide.

| Absorbance | Reflectivity (%) | Time (days) | Change in absorbance |
|---|---|---|---|
| 0.8492 | 31.7 | 0 | 0 |
| 0.9527 | 36 | 0.684027778 | 0.1035 |
| 0.9513 | 36.6 | 2.754166667 | 0.1021 |
| 0.949 | 37.6 | 3.701388889 | 0.0998 |
| 0.9487 | 36.2 | 4.689583333 | 0.0995 |
| 0.9472 | 36.2 | 5.75 | 0.098 |
| 0.9465 | 36.4 | 6.785416667 | 0.0973 |
| 0.9443 | 35.7 | 7.961805556 | 0.0951 |
| 0.9422 | 35.8 | 9.747916667 | 0.093 |
| 0.9405 | 35.8 | 10.78263889 | 0.0913 |
| 0.9366 | 35.6 | 16.72569444 | 0.0874 |

Data obtained from the disc having 3% carbon dioxide.

| Absorbance | Reflectivity (%) | Time (days) | Change in absorbance |
|---|---|---|---|
| 1.0181 | 37 | 0 | 0 |
| 1.0838 | 39.2 | 0.684722222 | 0.0657 |
| 1.0823 | 39.2 | 1.839583333 | 0.0642 |
| 1.081 | 40.9 | 3.5375 | 0.0629 |
| 1.0799 | 40.1 | 4.729166667 | 0.0618 |
| 1.0778 | 40 | 5.736111111 | 0.0597 |
| 1.0765 | 39.4 | 6.554166667 | 0.0584 |
| 1.0744 | 39.4 | 7.506944444 | 0.0563 |
| 1.0736 | 40.8 | 8.520138889 | 0.0555 |
| 1.073 | 39.7 | 10.59861111 | 0.0549 |
| 1.0712 | 39.9 | 11.53680556 | 0.0531 |
| 1.0703 | 39.5 | 12.52916667 | 0.0522 |

-continued

| Absorbance | Reflectivity (%) | Time (days) | Change in absorbance |
|---|---|---|---|
| 1.0698 | 40.1 | 13.59166667 | 0.0517 |
| 1.0716 | 39.9 | 14.62222222 | 0.0535 |
| 1.0693 | 39.3 | 15.80833333 | 0.0512 |
| 1.0682 | 39.5 | 17.59027778 | 0.0501 |
| 1.0678 | 39.1 | 18.62986111 | 0.0497 |
| 1.0658 | 39.2 | 24.56875 | 0.0477 |

Data obtained from the disc having 4% carbon dioxide.

| Absorbance | Reflectivity (%) | Time (days) | Change in absorbance |
|---|---|---|---|
| 0.7951 | 30.9 | 0 | 0 |
| 0.8542 | 32.5 | 0.826388889 | 0.0591 |
| 0.9254 | 35.1 | 1.954166667 | 0.1303 |
| 0.9781 | 36.3 | 3.111805556 | 0.183 |
| 1.0117 | 37.5 | 4.809722222 | 0.2166 |
| 1.0172 | 37.8 | 6.001388889 | 0.2221 |
| 1.0171 | 38.1 | 7.009027778 | 0.222 |
| 1.0188 | 38.6 | 7.825 | 0.2237 |
| 1.0175 | 37.9 | 8.779166667 | 0.2224 |
| 1.0177 | 37.7 | 9.792361111 | 0.2226 |
| 1.0174 | 38.8 | 11.86875 | 0.2223 |
| 1.0164 | 38.5 | 12.80763889 | 0.2213 |
| 1.0156 | 38.1 | 13.80138889 | 0.2205 |
| 1.016 | 38.5 | 14.86458333 | 0.2209 |

Data obtained from the disc having 10% carbon dioxide.

| Absorbance | Reflectivity (%) | Time (days) | Change in absorbance |
|---|---|---|---|
| 0.4751 | 21.3 | 0 | 0 |
| 0.475 | 21.4 | 0.652777778 | −0.0001 |
| 0.4752 | 21.8 | 2.723611111 | 1E−04 |
| 0.4748 | 21.7 | 2.724305556 | −0.0003 |
| 0.4744 | 21.8 | 3.669444444 | −0.0007 |
| 0.475 | 21.3 | 4.657638889 | −0.0001 |
| 0.4736 | 21.7 | 5.717361111 | −0.0015 |
| 0.4745 | 21.7 | 6.752777778 | −0.0006 |
| 0.4716 | 21.4 | 7.929861111 | −0.0035 |
| 0.4718 | 21.2 | 9.715972222 | −0.0033 |
| 0.4708 | 21 | 10.75069444 | −0.0043 |
| 0.4688 | 21.3 | 16.69375 | −0.0063 |
| 0.4685 | 21.1 | 17.89652778 | −0.0066 |

The Te film created with 10% $CO_2$ in the sputter gas showed much less variation in absorbance over time than the other films, although it also had lower reflectivity values. The lower reflectivity is due, at least in part, to the greater transparency of the film. The greater transparency is indicated by absorbance values that are lower than for the other films. This film is especially attractive for use in archival optical discs due to its superior stability.

Example 35

Preparation of Disc 356

Three films were sequentially deposited on a polycarbonate optical disc substrate with grooves such that a tellurium layer infused with $CO_2$ was sandwiched between two carbon layers. The substrate was 120 mm in diameter and was 0.6 mm thick.

The substrate was mounted onto the platen of the PVD 75 with the grooved side facing the guns. The first layer was deposited as follows: a ⅛" thick graphite target (Kurt J. Lesker Co., Clariton, Pa., part# EJTCXXX503A2, lot# VPU0140000) was sputtered with 400 W DC power, and 7 mtorr capman pressure. The sputter gas was 98% (v/v) argon gas and 2% (v/v) carbon dioxide. The substrate was rotated at 20 rpm. The substrate was exposed to the sputtered target for 10 minutes.

The second layer was deposited as follows: a ⅛" thick Te target (Plasmaterials, Lot# PLA5420787) with a copper backing plate was sputtered with 20 W DC power and 7 mtorr capman pressure. The sputter gas was 98% (v/v) argon gas and 2% (v/v) carbon dioxide. The substrate was rotated at 20 rpm. The substrate was exposed to the sputtered target for 6 minutes and 2 seconds.

The deposition parameters of the third layer were identical to the deposition parameters of the first layer.

Disc 356 has a polycarbonate support substrate, a first 7 nm carbon layer, an approximately 20 nm tellurium and carbon dioxide data layer, and a second 7 nm carbon layer.

Example 36

General Methods for Writing Data to Discs

Marks were made using a Pulstec ODU1000 instrument (Pulstec Industrial Co., Ltd.; Hamamatsu-City; Japan) with a diode laser set at a wavelength of 650 nm. All writing was performed at 1× speed (3.49 m/second). All writing was performed on single tracks unless otherwise noted. An HF signal was seen in all cases, and marks were positively observed using a microscope.

Example 37

Writing Data to Disc 356

Writing to disc number 356 was performed by repeatedly writing a mixed data format ("ROM1") to the disc at various power levels. The power levels were screened to determine the setting resulting in the minimum collective jitter value. Data-to-clock jitter measures variation in the timing for the leading edges of any pit relative to a clock signal, as opposed to data-to-data jitter, which is a measure of variation in the length of written pits. The following tables show the data obtained in two regions of the disc.

| Radial position (mm) | Write power (mW) | Jitter (ns) |
|---|---|---|
| 35.15 | 10.0 | 7.3 |
| 35.00 | 9.8 | 6.7 |
| 35.40 | 9.6 | 6.2 |
| 35.60 | 9.4 | 5.6 |
| 35.75 | 9.2 | 5.5 |
| 35.90 | 9.0 | 5.5 |
| 36.10 | 8.8 | 5.4 (minimum) |
| 36.30 | 8.6 | 5.6 |
| 22.30 | 8.8 | 6.2 |
| 22.10 | 9.0 | 6.0 |
| 22.45 | 9.2 | 5.7 |
| 22.60 | 9.4 | 5.6 |
| 22.75 | 9.6 | 5.5 (minimum) |
| 22.00 | 9.8 | 5.6 |

These results show that mixed data could be written to the disc, and that the write power could be optimized by monitoring jitter values.

Example 38

Preparation of Demo Discs 911 and 912

Four films were sequentially deposited on a polycarbonate optical disc substrate [D30W33] with tracking grooves. The substrate was 120 mm in diameter and was 0.6 mm thick. All four films were deposited without breaking vacuum.

The substrate was mounted onto the platen of the PVD 75 with the grooved side facing the guns. The platen was rotated during the deposition. The first layer was deposited as follows: a ⅛" thick SiO2 target bonded to a copper backing plate (Kurt J. Lesker Co., Clariton, Pa., part# EJBPCU03A2, lot# VPU014670/Apr. 8, 2008) was sputtered; the power was 400 W RF, the capman pressure was 3 mtorr; the sputter gas consisted of 100% Ar; the deposition time was 30 minutes. This $SiO_2$ film was approximately 35 nm thick.

The second layer was deposited as follows: a ¼" thick graphite target (Plasmaterials, Livermore, Calif., lot# PLA489556) was sputtered; the power was 400 W DC, the capman pressure was 7 mtorr; the principal component of the sputter gas was argon; the concentration of carbon dioxide in the sputter gas was 2%; the deposition time was 15 minutes. This carbon film was approximately 19 nm thick.

The third layer was deposited as follows: a ⅛" thick Te target bonded to a copper backing plate (Plasmaterials, lot# PLA489788) was sputtered; the power was 20 W DC, the capman pressure was 7 mtorr; the principal component of the sputter gas was argon; the concentration of carbon dioxide in the sputter gas was 2%; the deposition time was 5:23 minutes. This tellurium film was approximately 20 nm thick.

The conditions for the deposition of the fourth layer were identical to those of the second layer, except that the deposition time was 10 minutes. The fourth layer was deposited as follows: a ¼" thick graphite target (Plasmaterials, lot# PLA489556) was sputtered; the power was 400 W DC, the capman pressure was 7 mtorr; the principal component of the sputter gas was argon; the concentration of carbon dioxide in the sputter gas was 2%; the deposition time was 10 min. This carbon film was approximately 13 nm thick.

Discs 911 and 912 have a polycarbonate support substrate, a 35 nm $SiO_2$ intervening dielectric layer, a first 19 nm carbon with carbon dioxide layer, an approximately 20 nm tellurium and carbon dioxide data layer, and a second 13 nm carbon with carbon dioxide layer.

A second polycarbonate support was bonded onto the discs using a Spaceline II DVD line. The adhesive used was 0.9-1.1 grams of Pancure 1503, spun at 3500-3600 rpm. The adhesive was cured for 1.5-1.7 seconds at a curing power of 4.5 kVA.

Example 39

Demo Discs 911 and 912 Function Well in Commercial Players

Demo discs 911 and 912 were recorded upon in a manner that permits playback using a standard, commercial DVD player. Suitable laser power settings and pulse strategy values were derived prior to writing.

Pre-write evaluation steps included routine tests of reflectivity and of resistance to read-power-induced modulation ("RPIM"). The test of reflectivity involves mapping the reflectivity of the disc surface at discretionary intervals from the minimum to the maximum radial extents of the disc data area. This is accomplished using a Pulstec ODU-1000 system, consisting of the ODU control unit, an analog-to-digital signal binarizer, a multi-signal generator (MSG4) having an optical/mechanical disc drive unit, and a Yokogawa DL1640L digital oscilloscope, both operated under computer control. Test automation software logged and recorded the readings from the digital oscilloscope. An RPIM study was accomplished using the same equipment. The RPIM test assessed the resistance of the disc to change in average and local reflectivity under the influence of repeated, prolonged low-level laser exposure, for example 1.0 milliwatt. Both discs passed the pre-write evaluation.

After the pre-write tests were completed, preliminary power and write strategy optimization were performed using the named equipment and a Yokogawa TIA520 time interval analyzer, used to assess written data during playback. The time interval analyzer was used in a mode which provides a real-time graphical representation of previously written data to guide adjustments to power and strategy settings for subsequent write attempts. Using the ODU-1000 under manual control, a standard test pattern containing a pseudorandom combination of all possible standard DVD marks and spaces was written repeatedly to the discs at various power and write strategies. The resulting mean and standard deviation of each mark length for each mark type (3 T-14 T) following each write session was noted, and deviations of these values from nominal was used as the indication of need for strategy and/or laser write power adjustment. The result of this iterative work is an approximate determination of the disc's optimum write power and strategy settings. Manually controlled strategy and power optimization was followed by automated tests, as described below.

An (n-2) multi-pulse DVD+R write strategy was used. The actual, optimized powers and values of each of the parameters within the strategy differed slightly from disc to disc. One important metric, the combined, or "bucket", data-to-clock jitter also varied slightly from disc to disc as well. As the jitter represents the standard deviation of the timing of leading and trailing pulses for all of the marks in the pseudo-random test pattern, its minimization is one desirable outcome of the optimization ritual. Jitter was measured for both isolated, single-track performance and for multi-track performance. Following automated tests, in which the laser write power is changed and the is jitter measured for each power setting, the range of the observed minimum, multi-track jitter was 4.80 ns to 5.24 ns. The range of optimum power was 15.0 to 16.0 milliwatts. The write speed was standard 1×, constant linear velocity (CLV).

Following the optimization work described above, the standard DVD-formatted data were successfully written to each of the three discs. A DVD menu structure, linked to a presentation on the disc technology and to multi-media content, provided and licensed by the Church of Jesus Christ of Latter-Day Saints, the Les Olson Company (a distributor of Sharp copiers and printers) and THX Ltd., was written to the disc using the ODU-1000 and an Eclipse Data Technologies image encoder unit. Data from the Eclipse encoder was level-corrected by an Apogee Labs TTL-to-ECL converter, and streamed through the Pulstec multi-signal generator (MSG4) into the ODU-1000 laser head, where it was written upon the prototype discs using the previously-derived write strategy and power settings at 1× CLV.

After recording, the discs have been extensively playback-tested in several commercial DVD players and found to be free of errors preventing successful retrieval of the written data. This Example demonstrates that video content can be written to the discs, and that the discs can be repeatedly played in different commercial DVD players.

Example 40

Preparation of Discs 944 and 945 Having TeSe Alloy Data Layer and Carbon Layers Four films were sequentially deposited on a polycarbonate optical disc substrate [D27W40A-LB] with tracking grooves. The substrate was 120 mm in diameter and was 0.6 mm thick. All four films were deposited without breaking vacuum.

The substrate was mounted onto the platen of the PVD 75 with the grooved side facing the guns. The platen was rotated during the deposition. The first layer was deposited as follows: a ⅛" thick SiO2 target bonded to a copper backing plate (Kurt J. Lesker Co., Clariton, Pa., part# EJTSIO2453A2, lot# Nov. 24, 2008/VPU026926) was sputtered; the power was 400 W RF, the capman pressure was 3 mtorr; the sputter gas consisted of 100% Ar; the deposition time was 36:52 min. This film was approximately 45 nm thick.

The second layer was deposited as follows: a ¼" thick graphite target (Plasmaterials, Livermore, Calif., lot# PLA489556) was sputtered; the power was 400 W DC, the capman pressure was 7 mtorr; the principal component of the sputter gas was argon; the concentration of carbon dioxide in the sputter gas was 2%; the deposition time was 13:46 min. This film was approximately 19 nm thick.

The third layer was deposited as follows: a ⅛" thick target containing Te, 78.4 atom %, and Se, 21.6 atom % bonded to a copper backing plate (Plasmaterials, Livermore, Calif.) was sputtered. This target had a section that was sputtered through exposing the bonding agent. The power applied to the cathode was 200 W DC; the capman pressure was 3 mtorr; the sputter gas was Ar; the deposition time was 4:18 min. This film was approximately 20 nm thick.

The fourth layer was deposited as follows: a ¼" thick graphite target (Plasmaterials, lot# PLA489556) was sputtered; the power was 400 W DC, the capman pressure was 7 mtorr; the principal component of the sputter gas was argon; the concentration of carbon dioxide in the sputter gas was 2%; the deposition time was 9:25 min. This film was approximately 13 nm thick.

The resulting disc had a polycarbonate support substrate, a 45 nm $SiO_2$ dielectric intervening layer, a 19 nm carbon and carbon dioxide layer, a 20 nm TeSe alloy data layer, and a 13 nm carbon and carbon dioxide layer.

Example 41

Characterization of Discs 944 and 945 Having TeSe Alloy Data Layer and Carbon Layers TeSe alloy data discs were evaluated using the general methods described above regarding demo discs 911 and 912. While data marks were successfully written to the discs, there was a noticeable "settling time", where the jitter values changed for several minutes after writing. Efforts will be made to optimize these TeSe alloy data discs to minimize settling time effects.

Example 42

Preparation of a Disc Having Chromium Data Layer and Carbon Layers

Four films were sequentially deposited on a grooved polycarbonate optical disc substrate. The substrate was 120 mm in diameter and was 0.6 mm thick. All four films were deposited without breaking vacuum.

The substrate was mounted onto the platen of the PVD 75 with the grooved side facing the guns. The platen was rotated during the deposition. The first layer was deposited as follows: a ⅛" thick $SiO_2$ target bonded to a copper backing plate (Kurt J. Lesker Co., Clariton, Pa., part# EJTSIO2453A2, lot# Nov. 24, 2008/VPU026926) was sputtered; the power was 400 W RF, the capman pressure was 3 mtorr; the sputter gas consisted of 100% Ar; the deposition time was 44:12 min. This film was approximately 45 nm thick.

The second layer was deposited as follows: a ¼" thick graphite target (Plasmaterials, Livermore, Calif., lot# PLA489556) was sputtered; the power was 400 W DC, the capman pressure was 7 mtorr; the principal component of the sputter gas was argon; the concentration of carbon dioxide in the sputter gas was 2%; the deposition time was 15:20 min. This film was approximately 19 nm thick.

The third layer was deposited as follows: a ⅛" thick Cr target (Kurt J. Lesker Co., part#, EJTCRXX353A2, lot# L5791/D05/601713) was sputtered; the power was 200 W DC, the capman pressure was 3 mtorr; the sputter gas was Ar; the deposition time was 2:49 min. This film was approximately 20 nm thick.

The fourth layer was deposited as follows: a ¼" thick graphite target (Plasmaterials, lot# PLA489556) was sputtered; the power was 400 W DC, the capman pressure was 7 mtorr; the principal component of the sputter gas was argon; the concentration of carbon dioxide in the sputter gas was 2%; the deposition time was 10:30 min. This film was approximately 13 nm thick.

The resulting disc had a first polycarbonate support substrate, a 45 nm $SiO_2$ dielectric intervening layer, a 19 nm carbon and carbon dioxide layer, a 20 nm chromium data layer, a 13 nm carbon and carbon dioxide layer, and a second polycarbonate support substrate.

Example 43

Characterization of the Disc Having Chromium Data Layer and Carbon Layers

This disc passed the read-power-induced modulation ("RPIM") test at greater than 3.5 mW. This indicates that the disc is highly resistant to read-power laser intensities. Both 3 T and 14 T marks were made in the disc, although the mark quality was somewhat noisy. The write strategy has not yet been optimized.

Example 44

Preparation and Analysis of Disc 966 Having TeSe Data Layer but Lacking Carbon Layers Two films were sequentially deposited on a grooved polycarbonate optical disc substrate. The substrate was 120 mm in diameter and was 0.6 mm thick. All two films were deposited without breaking vacuum.

The substrate was mounted onto the platen of the PVD 75 with the grooved side facing the guns. The platen was rotated during the deposition. The first layer was deposited as follows: a ⅛" thick $SiO_2$ target bonded to a copper backing plate (Kurt J. Lesker Co., Clariton, Pa., part# EJTSIO2453A2, lot# Nov. 24, 2008/VPU026926) was sputtered; the power was 400 W RF, the capman pressure was 3 mtorr; the sputter gas consisted of 100% Ar; the deposition time was 44:12 min. This film was approximately 45 nm thick.

The second layer was deposited as follows: a compound TeSe target (Plasmaterials, Livermore, Calif., lot#

PLA489556) was sputtered. The target had a ratio of $Te_{78}Se_{22}$. This film was approximately 20 nm thick.

The resulting disc had a first polycarbonate support substrate, a 45 nm $SiO_2$ dielectric intervening layer, and a 20 nm $Te_{78}Se_{22}$ data layer. The disc did not contain any carbon layers.

The disc failed the read-power-induced modulation ("RPIM") test at 0.8 mW. This indicates that the low read powers used by disc drives damages the TeSe alloy data layer in the absence of a carbon layer. No further characterization of this disc was made after failing this basic test.

Example 45

Preparation and Analysis of Disc 967 Having Te Data Layer but Lacking Carbon Layers Three films were sequentially deposited on a grooved polycarbonate optical disc substrate. The substrate was 120 mm in diameter and was 0.6 mm thick. All three films were deposited without breaking vacuum.

The substrate was mounted onto the platen of the PVD 75 with the grooved side facing the guns. The platen was rotated during the deposition. The first layer was deposited as follows: a ⅛" thick $SiO_2$ target bonded to a copper backing plate (Kurt J. Lesker Co., Clariton, Pa., part# EJTSIO2453A2, lot# Nov. 24, 2008/VPU026926) was sputtered; the power was 400 W RF, the capman pressure was 3 mtorr; the sputter gas consisted of 100% Ar; the deposition time was 44:12 min. This film was approximately 45 nm thick.

The second layer was deposited as follows: a ⅛" thick Te target bonded to a copper backing plate (Plasmaterials, lot# PLA489788) was sputtered; the power was 20 W DC, the capman pressure was 7 mtorr; the principal component of the sputter gas was argon; the concentration of carbon dioxide in the sputter gas was 2%; the deposition time was 5:23 minutes. This tellurium film was approximately 20 nm thick.

The third layer was deposited as follows: a ⅛" thick $SiO_2$ target bonded to a copper backing plate (Kurt J. Lesker Co., Clariton, Pa., part# EJTSIO2453A2, lot# Nov. 24, 2008/VPU026926) was sputtered; the power was 400 W RF, the capman pressure was 3 mtorr; the sputter gas consisted of 100% Ar; the deposition time was 44:12 min. This film was approximately 45 nm thick.

The resulting disc had a first polycarbonate support substrate, a 45 nm $SiO_2$ dielectric intervening layer, a 20 nm tellurium and carbon dioxide data layer, and a a 45 nm $SiO_2$ dielectric intervening layer.

Example 46

Preparation and Analysis of Disc 968 Having Carbon Layers but Lacking a Data Layer Three films were sequentially deposited on a grooved polycarbonate optical disc substrate. The substrate was 120 mm in diameter and was 0.6 mm thick. All three films were deposited without breaking vacuum.

The substrate was mounted onto the platen of the PVD 75 with the grooved side facing the guns. The platen was rotated during the deposition. The first layer was deposited as follows: a ⅛" thick $SiO_2$ target bonded to a copper backing plate (Kurt J. Lesker Co., Clariton, Pa., part# EJTSIO2453A2, lot# Nov. 24, 2008/VPU026926) was sputtered; the power was 400 W RF, the capman pressure was 3 mtorr; the sputter gas consisted of 100% Ar; the deposition time was 44:12 min. This film was approximately 45 nm thick.

The second layer was deposited as follows: a ¼" thick graphite target (Plasmaterials, Livermore, Calif., lot# PLA489556) was sputtered; the power was 400 W DC, the capman pressure was 7 mtorr; the principal component of the sputter gas was argon; the concentration of carbon dioxide in the sputter gas was 2%. This film was approximately 30 nm thick.

The third layer was deposited as follows: a ⅛" thick $SiO_2$ target bonded to a copper backing plate (Kurt J. Lesker Co., Clariton, Pa., part# EJTSIO2453A2, lot# Nov. 24, 2008/VPU026926) was sputtered; the power was 400 W RF, the capman pressure was 3 mtorr; the sputter gas consisted of 100% Ar; the deposition time was 44:12 min. This film was approximately 45 nm thick.

The resulting disc had a first polycarbonate support substrate, a 45 nm $SiO_2$ dielectric intervening layer, a 30 nm carbon and carbon dioxide layer, and a 45 nm $SiO_2$ dielectric intervening layer. The disc did not contain any data layer.

This disc could be tracked, but all attempts to write data to the disc completely failed.

All of the compositions and/or methods and/or processes and/or apparatus disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and/or apparatus and/or processes and in the steps or in the sequence of steps of the methods described herein without departing from the concept and scope of the invention. More specifically, it will be apparent that certain agents which are both chemically and physically related may be substituted for the agents described herein while the same or similar results would be achieved. All such similar substitutes and modifications apparent to those skilled in the art are deemed to be within the scope and concept of the invention.

What is claimed is:

1. An optical information medium comprising:
   at least one support substrate;
   at least one data layer; and
   at least one carbon layer infused with at least one gas, wherein the main component of the carbon layer is carbon and where the carbon layer facially contacts the data layer.

2. The optical information medium of claim 1, wherein the data layer comprises an organic dye, a metal, or a metal alloy.

3. The optical information medium of claim 1, wherein the carbon layer comprises amorphous carbon, graphitic amorphous carbon, tetrahedral amorphous carbon, diamond-like amorphous carbon, polymer-like amorphous carbon, glass-like carbon, diamond-like carbon, or carbon black.

4. The optical information medium of claim 1, comprising a first carbon layer facially contacting the data layer, and a second carbon layer facially contacting the data layer.

5. The optical information medium of claim 1, further comprising at least one intervening layer between the support substrate and the data layer.

6. The optical information medium of claim 1, wherein the data layer comprises one or more sites to which data has been written.

7. The optical information medium of claim 1, wherein the data layer comprises tellurium, a tellurium alloy, selenium, a selenium alloy, tin, a tin alloy, bismuth, a bismuth alloy, antimony, an antimony alloy, lead, or a lead alloy.

8. The optical information medium of claim 1, wherein the data layer comprises tellurium metal or chromium metal.

9. An optical information medium comprising:
a first support substrate comprising polycarbonate;
a first dielectric layer facially contacting the first support substrate;
a first carbon layer infused with at least one gas, facially contacting the first dielectric layer wherein the main component of the carbon layer is carbon;
a metal material data layer facially contacting the first carbon material layer;
a second carbon layer infused with at least one gas, facially contacting the metal material data layer; and
a second dielectric layer facially contacting the second carbon material layer.

10. A method for preparing an optical information medium, the method comprising:
providing a support substrate;
applying a data layer; and
applying a carbon layer infused with at least one gas, such that the carbon layer facially contacts the data layer, and wherein carbon is the main component of the carbon layer.

11. The method of claim 10, wherein the applying a data layer step comprises sputtering, reactive sputtering, e-beam evaporation, laser ablation of a target, or chemical vapor deposition.

12. The method of claim 10, wherein the applying a carbon layer step comprises sputtering, reactive sputtering, e-beam evaporation, laser ablation of a target, or chemical vapor deposition.

13. The method of claim 10, further comprising applying at least one intervening layer, such that the intervening layer facially contacts both the support substrate and the data layer.

14. The method of claim 10, further comprising applying a second carbon layer, such that the second carbon layer is infused with at least one gas, and facially contacts the data layer.

15. A method for preparing an optical information medium, the method comprising:
providing a first support substrate;
applying a first dielectric layer, such that the first dielectric layer facially contacts the first support substrate;
applying a first carton layer infused with at least one gas, such that the first carbon layer facially contacts the first dielectric layer, wherein carbon is the main component of the carbon layer;
applying a data layer, such that the data layer facially contacts the first carbon layer;
applying a second carbon layer, such that the second carbon layer facially contacts the data layer; and
applying a second dielectric layer infused with at least one gas, such that the second dielectric layer facially contacts the second carbon layer.

16. An optical information medium as in claim 1, further comprising:
at least one data layer comprising:
tellurium; and
infused carbon dioxide, carbon monoxide, or both carbon dioxide and carbon monoxide.

17. The optical information medium of claim 16, further comprising at least one intervening layer between the support substrate and the data layer.

18. The optical information medium of claim 16, comprising a first support substrate and a second support substrate.

19. The optical information medium of claim 16, wherein the data layer comprises tellurium metal (Te) or at least one tellurium alloy.

20. The optical information medium of claim 16, wherein the data layer comprises $Te_xSe_{100-x}$, $Te_xSe_{100-x}$ (where X is less than or equal to 95), $Te_{86}Se_{14}$, $Te_{79}Se_{21}$, $Te_xSb_{100-x}$, $Te_xSb_{100-x}$ (where X is less than or equal to 95), $Te_xSe_ySb_z$, $Te_xSe_ySb_z$ (where X+Y+Z=100), $Te_xSe_ySb_z$ (where X+Y+Z=100, Y is 10-30, and Z is 5-20), $Te_{75}Se_{20}Sb_5$, $Te_{72.5}Se_{20}Sb_{7.5}$, $Te_3Sb_2$, $Te_xSe_yIn_z$, $Te_xSe_yIn_z$ (where X+Y+Z=100), $Te_xSe_yIn_z$ (where X+Y+Z=100, Y is 10-30, and Z is 5-20), $InTe_3$, $Te_{75}Se_{20}In_5$, $Te_{72.5}Se_{20}In_{7.5}$, $Te_xSe_yPb_z$, $Te_xSe_yPb_z$ (where X+Y+Z=100), $Te_xSe_yPb_z$ (where X+Y+Z=100, Y is 10-30, and Z is 5-20), $Te_{75}Se_{20}Pb_5$, $Te_{72.5}Se_{20}Pb_{7.5}$, TePb, $Te_xSe_ySn_z$, $Te_xSe_ySn_z$ (where X+Y+Z=100), $Te_xSe_ySn_z$ (where X+Y+Z=100, Y is 10-30, and Z is 5-20), $Te_{75}Se_{20}Sn_5$, $Te_{72.5}Se_{20}Sn_{7.5}$, $Te_3Bi_2$, $Te_xSe_yBi_z$, $Te_xSe_yBi_z$ (where X+Y+Z=100), TeSn, $Te_xSe_yBi_z$ (where X+Y+Z=100, Y is 10-30, and Z is 5-20), $Te_{75}Se_{20}Bi_5$, $Te_{72.5}Se_{20}Bi_{7.5}$, TeGeAs, TeGeSbS, $TeO_xGe$, TeOxSn, Pb—Te—Se, Pb—Te—Sb, As—Te, $As_{10}Te_{90}$, $As_{32}Te_{68}$, Ge—Te, $Ge_{10}Te_{90}$, or CdTe.

21. The optical information medium of claim 16, wherein the data layer comprises carbon dioxide and not carbon monoxide.

22. The optical information medium of claim 16, wherein the medium has a higher resistance to oxidation than does a corresponding medium lacking carbon dioxide and carbon monoxide.

23. A method for preparing an optical information medium as in claim 15, the method comprising:
applying a data layer comprising:
tellurium; and
infused carbon dioxide, carbon monoxide, or both carbon dioxide and carbon monoxide.

24. The method of claim 23, wherein the applying a data layer step comprises sputtering, reactive sputtering, e-beam evaporation, laser ablation of a target, or chemical vapor deposition.

25. The method of claim 23, wherein the applying a data layer step comprises applying tellurium in the presence of carbon dioxide but not in the presence of carbon monoxide.

26. The method of claim 23, wherein the applying a data layer step comprises applying tellurium in the presence of about 1% (v/v) to about 50% (v/v) carbon dioxide or carbon monoxide.

27. The method of claim 23, further comprising applying at least one intervening layer, such that the intervening layer facially contacts both the support substrate and the data layer.

28. The method of claim 23, further comprising applying a second support substrate.

29. An optical information medium, comprising:
at least one support substrate; and
at least one data layer consisting of carbon infused with at least one oxygenated gas.

30. The optical information medium of claim 29, wherein the data layer comprises carbon, amorphous carbon, diamond-like carbon, silicon carbide, boron carbide, boron nitride, silicon, amorphous silicon, germanium, amorphous germanium, or combinations thereof.

31. The optical information medium of claim 29, wherein the gas lacks oxygen atoms.

32. The optical information medium of claim 29, wherein the gas is molecular hydrogen ($H_2$), molecular nitrogen ($N_2$), helium (He), argon (Ar), neon (Ne), krypton (Kr), xenon (Xe), chlorine ($Cl_2$), and fluorine ($F_2$).

33. The optical information medium of claim 29, wherein the gas is an oxygenated gas.

34. The optical information medium of claim 29, wherein the gas is carbon monoxide, carbon dioxide, molecular oxygen, ozone, nitrogen oxides, sulfur oxides, or mixtures thereof.

35. The optical information medium of claim 29, wherein the gas is carbon dioxide.

* * * * *